US009563077B2

(12) United States Patent
Park et al.

(10) Patent No.: US 9,563,077 B2
(45) Date of Patent: Feb. 7, 2017

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Sang Ji Park, Yongin-si (KR); Hee-Keun Lee, Suwon-si (KR); Soo Jung Lee, Yongin-si (KR); Ji Yeon Choi, Yongin-si (KR)

(73) Assignee: Samsung Display Co., Ltd. (KR)

( * ) Notice: Subject to any disclaimer, the term of this patent is extended or adjusted under 35 U.S.C. 154(b) by 37 days.

(21) Appl. No.: 14/332,249

(22) Filed: Jul. 15, 2014

(65) Prior Publication Data

US 2015/0160506 A1    Jun. 11, 2015

(30) Foreign Application Priority Data

Dec. 5, 2013    (KR) .................... 10-2013-0150655

(51) Int. Cl.
*G02F 1/1339* (2006.01)
*G02F 1/1333* (2006.01)
*G02F 1/1341* (2006.01)

(52) U.S. Cl.
CPC ........ *G02F 1/133377* (2013.01); *G02F 1/1341* (2013.01)

(58) Field of Classification Search
CPC .............. G02F 1/133345; G02F 1/133377; G02F 1/1341
USPC ........................................................ 349/154
See application file for complete search history.

(56) References Cited

U.S. PATENT DOCUMENTS

2007/0052119 A1* 3/2007 Sakai ................ G02F 1/133516
 264/1.7
2013/0248086 A1* 9/2013 Hamada ................ G02F 1/1339
 156/145

FOREIGN PATENT DOCUMENTS

KR    10-2012-0026880    3/2012
KR    10-2014-0094916    7/2014
KR    10-2015-0008758    1/2015

OTHER PUBLICATIONS

Grecov et al. "Multiscale Simulation of Flow-Induced Texture Formation in Thermotropic Liquid Crystals" Nanotech vol. 2, 2004, pp. 422-425.

* cited by examiner

*Primary Examiner* — Charles Chang
(74) *Attorney, Agent, or Firm* — Innovation Counsel LLP

(57) ABSTRACT

Provided is a liquid crystal display, including: an insulating substrate, the insulating substrate includes a center region and an edge region surrounding the center region; a roof layer formed on the insulating substrate, and configured to support a plurality of separated microcavities; a pixel electrode formed on the insulating substrate, and formed in the microcavity supported by the roof layer; and a liquid crystal layer positioned within the microcavity, in which the roof layer includes an opening for injecting a liquid crystal into the plurality of microcavities, and the opening in the center region has a substantially uniform size, and the opening in the edge region is smaller than the opening in the center region.

9 Claims, 32 Drawing Sheets

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2013-0150655 filed in the Korean Intellectual Property Office on Dec. 5, 2013, the entire contents of which are incorporated herein by reference.

BACKGROUND (a) Field

Embodiments of the present inventive concept relates to a liquid crystal display and a manufacturing method thereof, and more particularly, to a liquid crystal display having a liquid crystal layer (nano crystal) present within a microcavity, and a manufacturing method thereof.

(b) Description of the Related Art

A liquid crystal display is one of the most common types of flat panel displays currently in use, and includes two display panels having field generating electrodes such as a pixel electrode and a common electrode, and a liquid crystal layer interposed therebetween.

The liquid crystal display displays an image by applying a voltage to the field generating electrode to generate an electric field in the liquid crystal layer, determining alignment of liquid crystal molecules of the liquid crystal layer through the generated electric field, and controlling polarization of incident light.

A nano-crystalline device is a liquid crystal display having an embedded microcavity (EM) structure (nano crystal structure). The nano-crystalline device is formed by forming a sacrificial layer of a photoresist, applying a support member on an upper portion of the sacrificial layer, removing the sacrificial layer, and filling liquid crystal in an empty space formed by removing the sacrificial layer.

However, when the liquid crystal is injected into the EM structure, the liquid crystal leaks to and remains in the outside of the microcavity formed on the panel at an edge region of the panel, so that a display defect may be generated.

The above information disclosed in this Background section is only for enhancement of understanding of the background of the inventive concept and therefore it may contain information that does not constitute prior art.

SUMMARY

The inventive concept has been made in an effort to provide a liquid crystal display including a liquid crystal layer (nano crystal) present inside a microcavity, which has excellent liquid crystal alignment inside the microcavity formed at an edge region of a panel by adjusting a size of a liquid crystal injection hole between a plurality of microcavities formed at the edge region of the panel among the respective microcavities into which a liquid crystal is injected, and a manufacturing method thereof.

An exemplary embodiment of the inventive concept provides a liquid crystal display, including: an insulating substrate, the insulating substrate includes a center region and an edge region surrounding the center region; a roof layer formed on the insulating substrate, and configured to support a plurality of separated microcavities; a pixel electrode formed on the insulating substrate, and formed in the microcavity supported by the roof layer; and a liquid crystal layer positioned within the microcavity, in which the roof layer includes an opening for injecting a liquid crystal into the plurality of microcavities, and the opening in the center region has a uniform size, and the opening in the edge region is smaller than the opening in the center region.

At least one column of the openings formed at the edge region of the insulating substrate may be formed to be smaller than the openings formed in the center regions of the insulating substrate.

A size of the opening formed at the edge region of the insulating substrate may be about 3 μm to less than 55 μm.

The opening may be gradually narrow in a step shape from the center regions of the insulating substrate to the edge region of the insulating substrate.

The size of the opening may be formed to be decreased from a position, at which the microcavity positioned 3 to 8 columns inside based on the plurality of microcavities in a direction of the center regions of the insulating substrate is formed, to the edge region of the insulating substrate.

The opening may be gradually decreased in a step shape from the center regions of the insulating substrate to the edge region of the insulating substrate.

At least an outmost opening may be wider than an opening next to the outmost opening.

At least five openings from an edge of the insulating substrate may be smaller than the opening in the center region.

The opening may be continuously increased in size from the center regions of the insulating substrate to the edge region of the insulating substrate.

Another exemplary embodiment of the inventive concept provides a method of manufacturing a liquid crystal display, including: forming a sacrificial layer on an insulating substrate including a center region and an edge region surrounding the center region; forming a common electrode on an entire surface of the insulating substrate on which the sacrificial layer is formed; forming a roof layer including an opening for injecting a liquid crystal on the common electrode; forming microcavities by removing the common electrode and the sacrificial layer; and injecting a liquid crystal into the microcavities supported by the roof layer through the opening, in which the opening in the center region has a substantially uniform size, and the opening in the edge region is formed to be smaller than the opening in the center region, and the liquid crystal is directly injected only in the center regions of the insulating substrate except for an edge of the insulating substrate.

According to the exemplary embodiments of the inventive concept, it is advantageously possible to prevent a display defect generable due to the liquid crystal at the outside of the microcavity at the edge of the panel, and prevent a liquid crystal alignment defect inside the microcavity formed at the edge region of the panel.

Further, according to the exemplary embodiments of the inventive concept, it is advantageously possible to display an image up to the edge of the panel through the excellent liquid crystal alignment inside the microcavity formed at the edge region of the panel, and thus further decrease a bezel area of the display device.

DETAILED DESCRIPTION OF THE EMBODIMENTS

Figure 1:
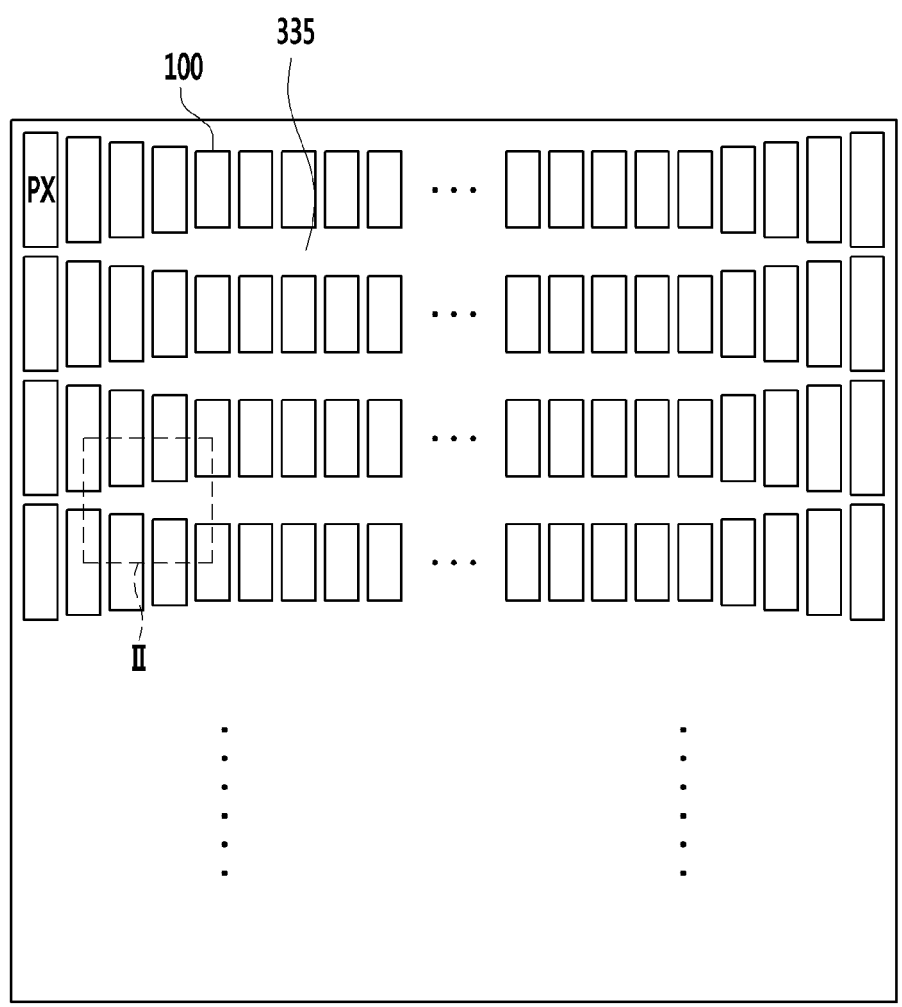
FIG. 1 is a pixel layout view of a liquid crystal display according to an exemplary embodiment of the inventive concept.

The inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it is formed directly on the other element or it is formed with intervening elements. In contrast, when an element is referred to as being "directly on" another element, there are no intervening elements present.

A liquid crystal display having an EM structure is generally manufactured by removing a sacrificial layer and then injecting a liquid crystal through liquid crystal injection holes formed between a plurality of microcavities. The liquid crystal may not be injected into the microcavities as intended at an edge region of a panel and the residual liquid crystal is present at the outside of the microcavities, so that a display defect may be generated.

Accordingly, in order to prevent the display defect from being generated due to the residual liquid crystal at the edge region of the panel, the liquid crystal for the edge region is not injected on the edge region. Instead, the liquid crystal injected on the center regions adjacent to the edge region of the panel flows to the edge of the panel and is filled in the microcavity positioned at the edge region.

However, in this case, since the liquid crystal flows to the edge region from the center region of the panel, the edge region of the panel may not be completely filled with the liquid crystal, so that a display defect may be generated at the edge region of the panel.

The edge region of a display area, in which the liquid crystal is not completely filled, has to be covered by a black matrix (BM) to prevent light from being emitted. The bezel region of the panel may be increased due to an increase in BM area. Thus, the narrow bezel may not be realized.

Accordingly, it is significant to fill the liquid crystal at the edge region of the display area correctly. A liquid crystal display according to an exemplary embodiment of the inventive concept for solving the aforementioned problems will be described in detail with reference to FIGS. 1 to 5.

Figure 2:
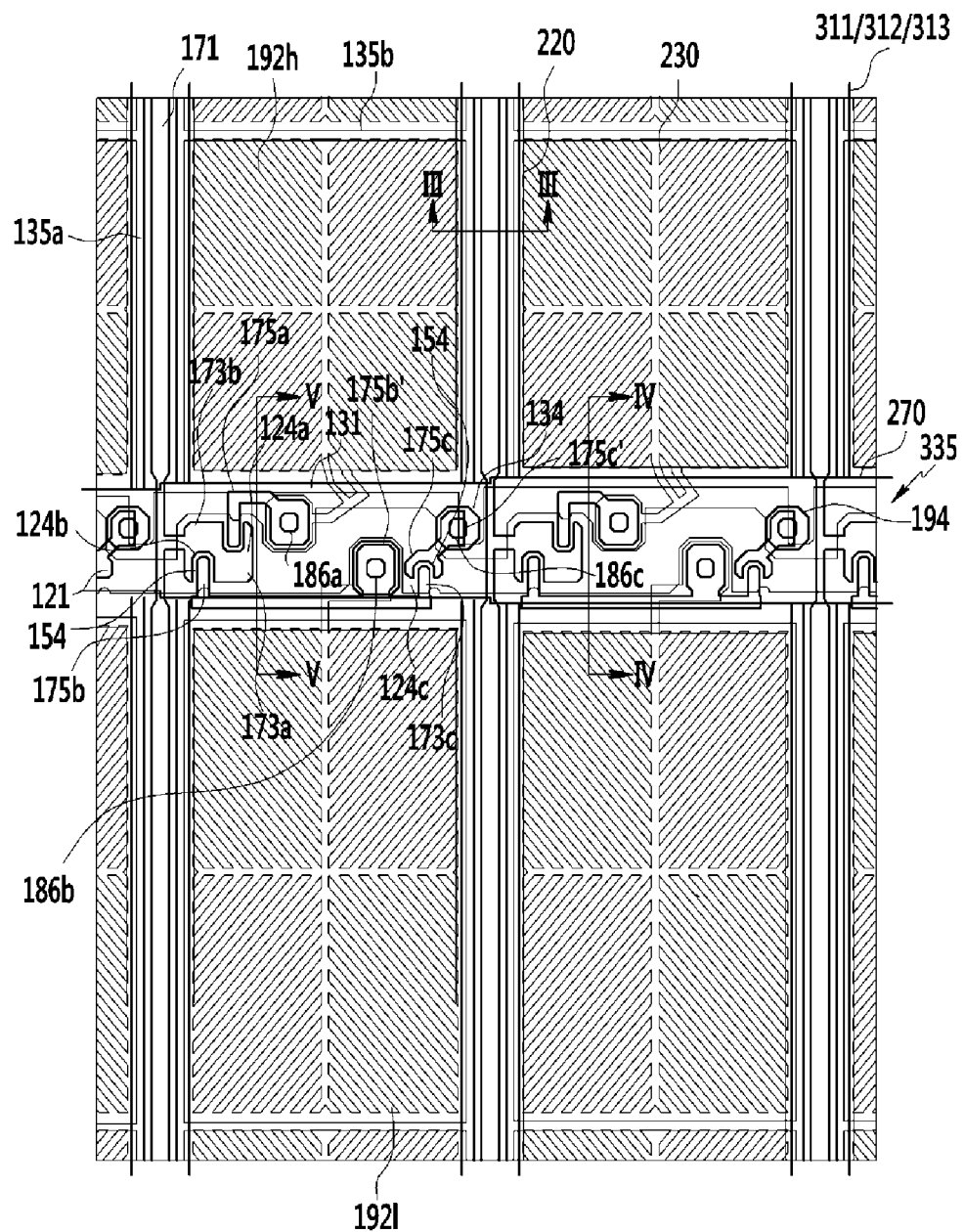
FIG. 2 is an enlarged layout view of region I of the liquid crystal display of FIG. 1 according to the exemplary embodiment of the inventive concept.
Figure 3:
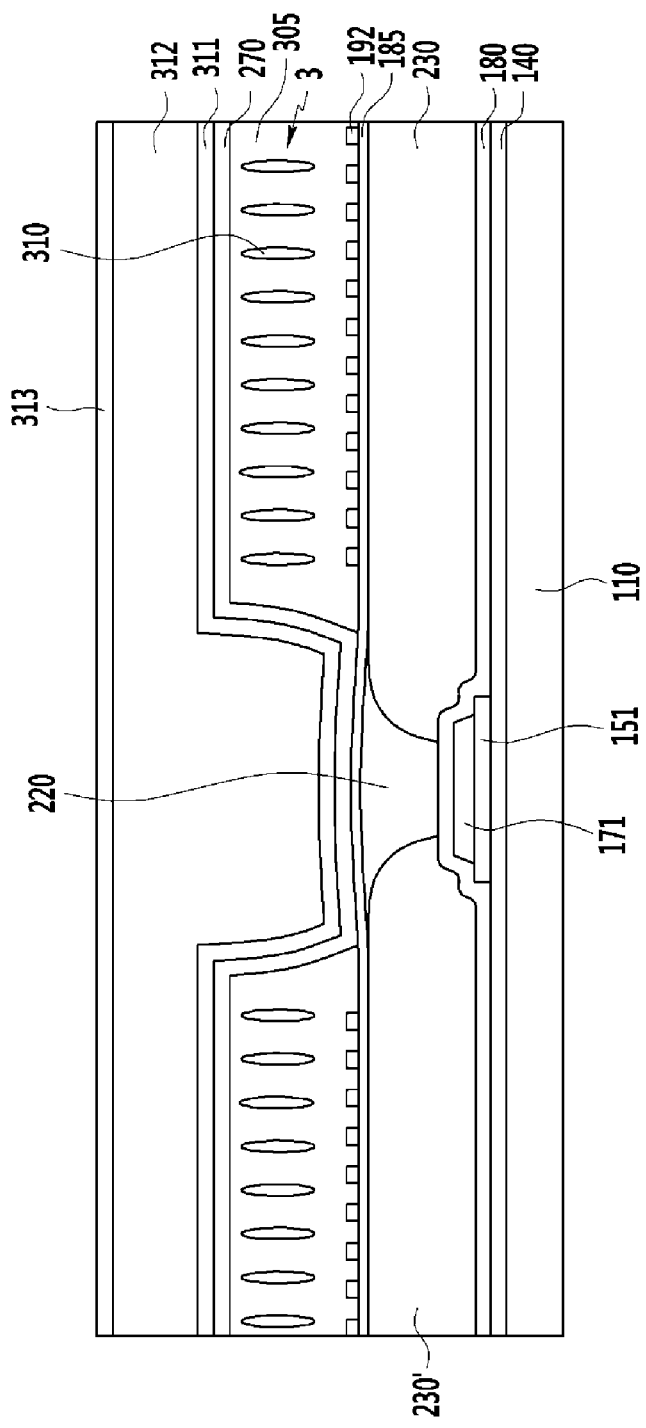
FIG. 3 is a cross-sectional view taken along line II-II of FIG. 2.
Figure 4:
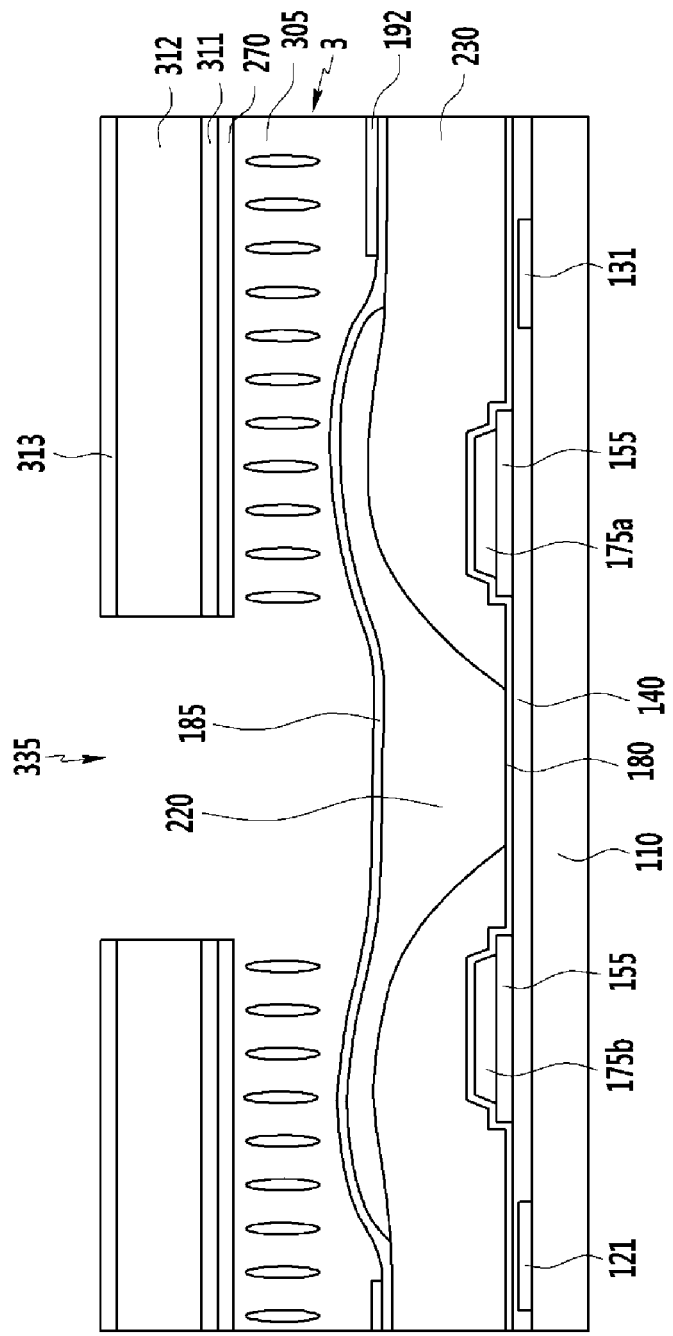
FIG. 4 is a cross-sectional view taken along line III-III of FIG. 2.
Figure 5:
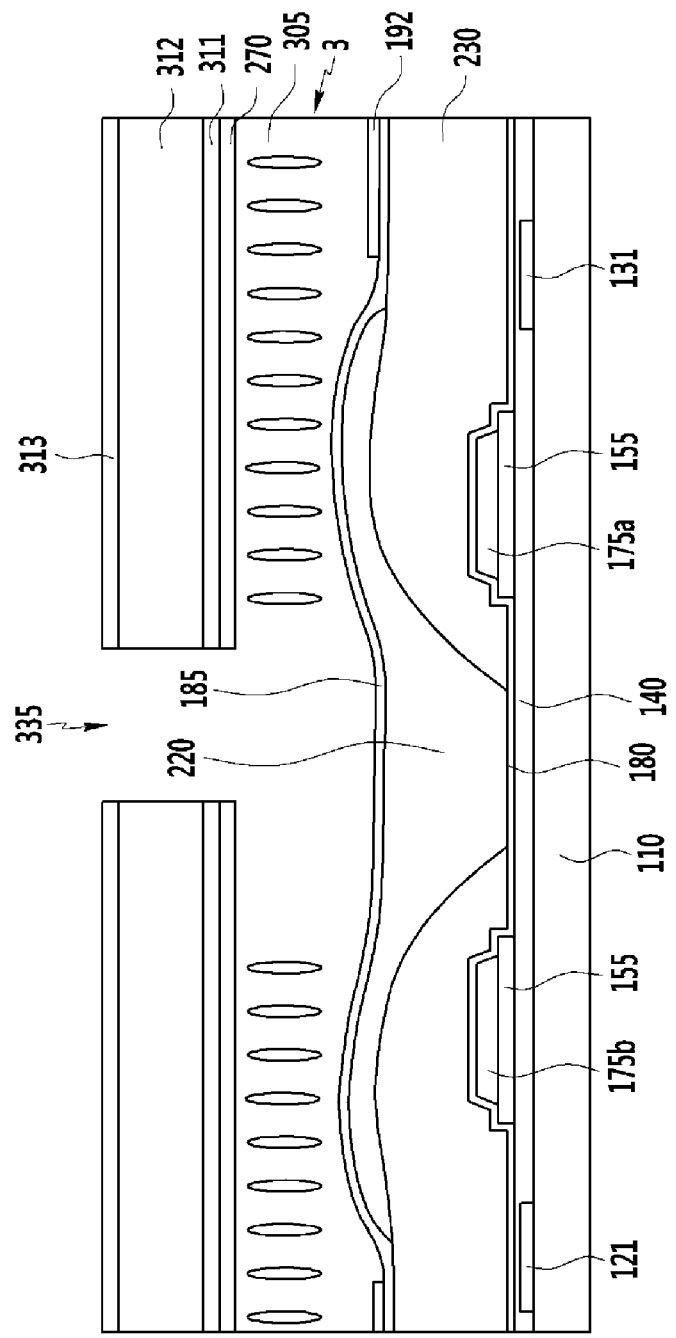
FIG. 5 is a cross-sectional view taken along line IV-IV of FIG. 2.

FIG. 1 is a pixel layout view of a liquid crystal display according to an exemplary embodiment of the present inventive concept. FIG. 2 is an enlarged layout view of region I of the liquid crystal display of FIG. 1 according to the exemplary embodiment of the present inventive concept. FIG. 3 is a cross-sectional view taken along line II-II of FIG. 2. FIG. 4 is a cross-sectional view taken along line III-III of FIG. 2. FIG. 5 is a cross-sectional view taken along line IV-IV of FIG. 2.

Referring to FIG. 1, a plurality of pixels 100 of the liquid crystal display having an EM structure according to the exemplary embodiment of the inventive concept is formed at an edge region positioned at an edge of a display area and the center regions surrounding the edge region.

Here, the edge region of the display area means a region of the outermost display area in which 10 or fewer pixels 100 are disposed, and the center regions means regions in which the pixels 100 except for the pixels 100 disposed at the edge region are disposed.

Openings 335 formed in the center region in a roof layer for injecting a liquid crystal to the pixels 100 are formed to have a uniform size, and openings 335 at the edge region are formed to have a smaller size than the openings in the center region. The size of the openings 335 may be decreased gradually as being close to the edge region.

FIG. 1 illustrates a configuration of the openings 335. The opening 335 becomes narrow from the fifth pixel 100 from a left side or a right side from the edge. The liquid crystal is directly injected on an inside of the pixels 100 formed at the fifth positions from the left side and the right side of the panel.

However, a point of the pixel 100 in which the opening 335 becomes narrower may be differently formed from the exemplary embodiment illustrated in FIG. 1 as necessary.

In general, the driving force of the injection of the liquid crystal for forming a liquid crystal layer inside the pixel 100 is capillary force, and the capillary force may be changed according to a size of the opening 335. The capillary force is decreased as the size of the opening 335 is increased, and the capillary force is increased as the size of the opening 335 is decreased.

In order to smoothly perform the injection of the liquid crystal, stronger capillary force is required as a distance is increased from the pixel 100 in which the liquid crystal is directly injected.

Considering this fact, the size of the opening 335 of the pixel 100, on which the liquid crystal is not directly injected, is formed to be smaller than the size of the openings 335 of the pixel 100 on which the liquid crystal is directly injected. Thus the liquid crystal is injected into the pixel 100 properly, thereby achieving excellent liquid crystal alignment.

Further, because the pixels formed close to the pixel 100 into which the liquid crystal is directly injected need relatively smaller capillary force compared to pixels formed away from the pixel 100 into which the liquid crystal is directly injected, the opening 335 is formed to be gradually decreased in size as a distance from the pixel 100 into which the liquid crystal is directly injected is increased.

Referring to FIGS. 2 to 4, the liquid crystal display according to the exemplary embodiment of the inventive concept includes a gate line 121 and a storage voltage line 131 formed on an insulating substrate 110 formed of transparent glass or plastic. The gate line 121 includes a first gate electrode 124*a*, a second gate electrode 124*b*, and a third gate electrode 124*c*. The storage voltage line 131 includes storage electrodes 135*a* and 135*b*, and a protrusion 134 protruding in a direction of the gate line 121. The storage electrodes 135*a* and 135*b* have a structure surrounding a first subpixel electrode 192*h* and a second subpixel electrode 192*l* of the previous pixel. The horizontal portion 135*b* of the storage electrode of FIG. 2 may be one wire which is not separated from the horiziontal portion 135*b* of the previous pixel.

A gate insulating layer 140 is formed on the gate line 121 and the storage voltage line 131. A semiconductor 151 disposed on a lower portion of a data line 171, a semiconductor 155 disposed on lower portions of source/drain electrodes, and a semiconductor 154 forming a channel portion of a thin film transistor are formed on the gate insulating layer 140.

A plurality of ohmic contacts (not illustrated) may be formed on each of the semiconductors, 151, 154, and 155, and between the data line 171 and the source/drain electrodes.

The plurality of data lines 171 including a first source electrode 173*a* and a second source electrode 173*b*, data conductors 171, 173*c*, 175*a*, 175*b*, and 175*c* including a first drain electrode 175*a*, a second drain electrode 175*b*, a third source electrode 173*c*, and a third drain electrode 175*c* are formed on each of the semiconductors 151, 154, and 155 and the gate insulating layer 140.

The first gate electrode 124*a*, the first source electrode 173*a*, and the first drain electrode 175*a* form a first thin film transistor Qa together with the semiconductor 154, and a channel of the thin film transistor is formed at the semiconductor portion 154 between the first source electrode 173*a* and the first drain electrode 175*a*. Similarly, the second gate electrode 124*b*, the second source electrode 173*b*, and the second drain electrode 175*b* form a second thin film transistor Qb together with the semiconductor 154, the channel of the thin film transistor is formed in the semiconductor portion 154 between the second source electrode 173*b* and the second drain electrode 175*b*, the third gate electrode 124*c*, the third source electrode 173*c*, and the third drain electrode 175*c* form a third thin film transistor Qc together with the semiconductor 154, and the channel of the thin film transistor is formed in the semiconductor portion 154 between the third source electrode 173*c* and the third drain electrode 175*c*.

The data line 171 of the exemplary embodiment of the inventive concept has a structure in which a width thereof is decreased in the thin film transistor formed region around an expanded portion 175*c*' of the third drain electrode 175*c*. The structure is for the purpose of maintaining an interval from an adjacent wire and decreasing signal interference, but is not essentially formed in this manner.

A first passivation layer 180 is formed on the data conductors 171, 173*c*, 175*a*, 175*b*, and 175*c* and the exposed semiconductor portion 154. The first passivation layer 180 may include an inorganic insulation material, such as silicon nitride (SiNx) and silicon oxide (SiOx) or an organic insulation material.

A color filter 230 is formed on the passivation layer 180. The color filters 230 with the same color are formed in the pixels adjacent in a vertical direction (a direction of the data line). Further, color filters 230 and 230' with different colors are formed at the pixels adjacent in a horizontal direction (a direction of the gate line), and the two color filters 230 and 230' may overlap each other on the data line 171. The color filters 230 and 230' may display any one of the primary colors, such as the three primary colors of red, green, and blue. However, the color is not limited to the three primary colors of red, green and blue colors, and any one of cyan, magenta, yellow, and white-based colors may be displayed.

A light blocking member (black matrix) 220 is formed on the color filters 230 and 230'. The light blocking member 220 is formed on a region in which the gate line 121, the storage voltage line 131, and the thin film transistor are formed (hereinafter, a "transistor formed region"), and a region in which the data line 171 is formed, and is formed in a lattice structure having an opening corresponding to an area displaying an image. The color filter 230 is formed in the opening of the light blocking member 220. Further, the light blocking member 220 is formed of a material through which light cannot pass.

A second passivation layer 185 is formed on the color filter 230 and the light blocking member 220 to cover the color filter 230 and the light blocking member 220. The second passivation layer 185 may include an inorganic insulation material, such as silicon nitride (SiNx) and silicon oxide (SiOx) or an organic insulation material. Differently from the illustration of the cross-sectional views of FIGS. 3 and 4, when a step is generated due to a thickness difference between the color filter 230 and the light blocking member 220, the organic insulation material may be included in the second passivation layer 185, thereby decreasing or removing the step.

A first contact hole 186*a* and a second contact hole 186*b*, through which the first drain electrode 175*a* and the expanded portion 175*b*' of the second drain electrode 175*b* are exposed, respectively, are formed in the color filter 230, the light blocking member 220, and the passivation layers 180 and 185. Further, a third contact hole 186*c*, through which the protrusion 134 of the storage voltage line 131 and the expanded portion 175*c*' of the third drain electrode 175*c* are exposed, is formed in the color filter 230, the light blocking member 220, and the passivation layers 180 and 185.

In the present exemplary embodiment, the contact holes 186*a*, 186*b*, and 186*c* are formed in the light blocking member 220 and the color filter 230, but etching of the contact holes of the light blocking member 220 and the color filter 230 may actually be more difficult than the etching of the passivation layers 180 and 185 depending on the materials of the light blocking member 220 and the color filter 230. Accordingly, the light blocking member 220 or the color filter 230 may be removed in advance in the areas at which the contact holes 186*a*, 186*b*, and 186*c* are formed when forming the light blocking member 220 or the color filter 230.

In the meantime, according to the exemplary embodiment, the contact holes 186*a*, 186*b*, and 186*c* may be formed by etching only the color filter 230 and the passivation layers 180 and 185 by changing the position of the light blocking member 220.

A pixel electrode 192 including the first subpixel electrode 192*h* and the second subpixel electrode 192*l* is formed on the second passivation layer 185. The pixel electrode 192 may be made of a transparent conductive material, such as ITO or IZO.

The first subpixel electrode 192h and the second subpixel electrode 192l are adjacent in a column direction, generally have a quadrangular shape, and may include a cross-shaped stem portion including a horizontal stem portion and a vertical stem portion crossing the horizontal stem portion. Further, the first subpixel electrode 192h and the second subpixel electrode 192l are divided into four sub regions by the horizontal stem portion and the vertical stem portion, and each sub region includes a plurality of micro branch portions.

The micro branch portions of the first subpixel electrode 192h and the second subpixel electrode 192l have an angle of approximately 40° to 45° with the gate line 121 or the horizontal stem portion. Further, the micro branch portions of the two adjacent sub regions may be orthogonal to each other. Further, a width of the micro branch portion may be gradually increased, and intervals between the micro branch portions may be different from each other.

The first subpixel electrode 192h and the second subpixel electrode 191l are physically and electrically connected with the first drain electrode 175a and the second drain electrode 175b through the contact holes 186a and 186b, respectively, and receive the data voltage from the first drain electrode 175a and the second drain electrode 175b.

In the meantime, a connection member 194 electrically connects the expanded portion 175c' of the third drain electrode 175c and the protrusion 134 of the storage voltage line 131 through the third contact hole 186c. As a result, a part of the data voltage applied to the second drain electrode 175b is divided through the third source electrode 173c, so that a voltage applied to the second subpixel electrode 192l may be smaller than the voltage applied to the first subpixel electrode 192h.

Here, an area of the second subpixel electrode 192l may be equal to or larger than one time and equal to or smaller than 2 times of an area of the first subpixel electrode 192h.

In the meantime, the second passivation layer 185 may include an opening in which gas discharged from the color filter 230 is collectable, and a cover formed of the same material as that of the pixel electrode 192 on the opening to cover the corresponding opening. The opening and the cover are the structure for blocking the gas discharged from the color filter 230 from being transmitted to another element, and is not an essential element of the inventive concept.

A common electrode 270 is formed on the second passivation layer 185, the pixel electrode 192, and the liquid crystal layer 3 injected into the microcavity 305. The common electrode 270 is formed on a horizontal portion of the microcavity 305 that corresponds to a portion in which the pixel electrode 192 is formed, on a lateral surface of the microcavity 305, and on an upper portion of the second passivation layer 185 that corresponds to the position of the light blocking member 220. Further, the common electrode 270 may receive a common voltage Vcom, and the adjacent common electrodes 270 may be connected with each other in the transistor formed region (or the region around the opening 335).

Because a lower insulating layer 311 and a roof layer 312 to be described below supports the common electrode 270, the common electrode 270 maintains a predetermined shape of the microcavity 305.

The common electrode 270 is formed of a transparent conductive material, such as ITO or IZO, and serves to control an alignment direction of liquid crystal molecules 310 by generating an electric field together with the pixel electrode 192.

A lower insulating layer 311 is positioned on the common electrode 270 and the second passivation layer 185, and on the lateral surface of the liquid crystal layer 3 (or the lateral surface of the microcavity 305). The lower insulating layer 311 may have the opening 335 in one lateral surface so as to inject the liquid crystal into the microcavity 305. The lower insulating layer 311 may include an inorganic insulation material, such as silicon nitride (SiNx). The opening 335 may be used when removing the sacrificial layer for forming the microcavity 305. This will be described in detail when describing a manufacturing method.

Further, in order to arrange the liquid crystal molecules injected into the microcavity 305, an alignment layer (not illustrated) may be formed inside the microcavity 305. The alignment layer may be formed to include at least one of materials generally used as a liquid crystal alignment layer, such as polyamic acid, polysiloxane, or polyimide.

The liquid crystal layer 3 is formed inside the microcavity 305 on the alignment layer. The liquid crystal molecules 310 are initially arranged by the alignment layer, and an arrangement direction thereof is changed according to the applied electric field. A height of the liquid crystal layer 3 corresponds to a height of the microcavity 305. The liquid crystal layer 3 positioned in the microcavity 305 is also referred to as a nano crystal.

The liquid crystal layer 3 and the alignment layer formed in the microcavity 305 may be injected into the microcavity 305 by using capillary force.

The roof layer 312 is formed on the lower insulating layer 311. The roof layer 312 may serve to support the common electrode 270 so that a space (microcavity) between the pixel electrode 192 and the common electrode 270 is maintained, and, thus, the nano liquid crystal may be formed. The roof layer 312 according to the present exemplary embodiment serves to support the microcavity 305, and may have the opening 335 in one lateral surface in order to inject the liquid crystal into the microcavity 305.

An upper insulating layer 313 is formed on the roof layer 312. The upper insulating layer 313 may include an inorganic insulation material, such as silicon nitride (SiNx). The roof layer 312 and the upper insulating layer 313 are patterned together with the lower insulating layer 311 to form the opening 335.

Depending on the exemplary embodiment, the lower insulating layer 311 and the upper insulating layer 313 may be omitted.

A capping layer (not illustrated) is formed on the upper insulating layer 313, so that it is possible to block the liquid crystal molecules 310 from being discharged to the outside through the opening 335.

A polarizer (not illustrated) is positioned on a lower portion of the insulating substrate 110 and an upper portion of the upper insulating layer 313 (or the upper portion of the capping layer). The polarizer may include a polarization element generating polarization and a TAC (tri-acetyl-cellulose) layer for ensuring durability, and directions of transmissive axes of an upper polarizer and a lower polarizer may be vertical or parallel according to the exemplary embodiment.

FIG. 5 illustrates the opening portion 335 positioned at the edge region of the panel according to the exemplary embodiment of the inventive concept, and the opening 335 is substantially the same as the opening portion 335 aforementioned with reference to FIG. 4 except for the size of the opening 335, so that a repeated description will be omitted.

The opening 335 positioned at the edge region of the panel is formed to have a relatively small size, which is different from the opening 335 positioned in the center region of the panel illustrated in FIG. 4.

As described above, in order to smoothly inject the liquid crystal, stronger capillary force is required as a distance is far from the pixel 100 (FIG. 4) formed in the center region of the panel into which the liquid crystal is directly injected on the panel to the pixel 100 (FIG. 5) positioned at the edge region of the panel into which the liquid crystal is not directly injected.

Considering the fact, the opening 335 of the pixel 100 (FIG. 5), into which the liquid crystal is not directly injected, formed at a position far from the pixel 100 (FIG. 4), into which the liquid crystal is directly injected, is formed to have a smaller size, so that it is possible to easily inject the liquid crystal and it is possible to more excellently align the liquid crystal.

The size of the opening 335 positioned in the center region of the panel may be about 45 μm to about 55 μm, and thus the size of the opening 335 positioned at the edge region of the panel is about 3 μm to less than about 55 μm and may be formed to be decreased in a step shape as the opening 335 is close to the edge region.

However, the size of the opening 335 is not limited and may be variously formed. If the size of the opening 335 positioned at the edge region of the panel may be formed to be smaller than the size of the opening 335 positioned in the center region of the panel, the particular size of the opening 335 may be variously formed.

Then, a liquid crystal display according to another exemplary embodiment of the inventive concept will be described in detail with reference to FIG. 6.

Figure 6:
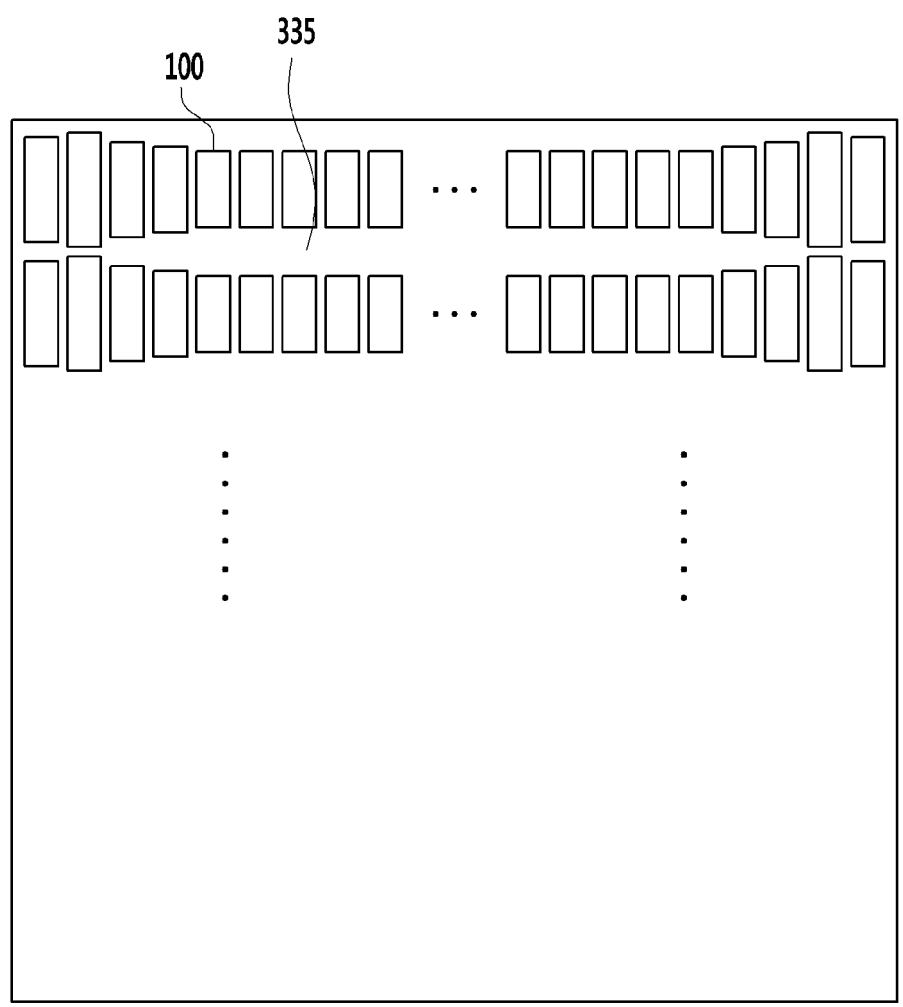
FIG. 6 is a pixel layout view of a liquid crystal display according to another exemplary embodiment of the present inventive concept.

FIG. 6 is a pixel layout view of a liquid crystal display according to another exemplary embodiment of the present inventive concept.

In another exemplary embodiment of the inventive concept illustrated in FIG. 6, the liquid crystal display is substantially the same as that of the exemplary embodiment illustrated in FIG. 1, except for a shape of a pixel 100 and a size of an opening 335 formed at an edge region of a panel, so that a repeated description will be omitted.

As illustrated in FIG. 6, contrary to the liquid crystal display according to the exemplary embodiment illustrated in FIG. 1, the pixel 100 formed at the edge region of the liquid crystal display according to another exemplary embodiment of the inventive concept may be formed to have a step shape and the opening 335 is gradually decreased in a step shape as the opening becomes close to the edge region of a panel, and the opening 335 becomes slightly wide in an outermost portion again.

However, in this case, even though the opening 335 formed in the outermost portion is formed to become wide again, the opening 335 formed in the outermost portion needs to be formed to be smaller than the opening 335 of the pixel 100 positioned in the center region of the panel. At least five openings from an edge of the insulating substrate may be smaller than the opening in the center region.

A liquid crystal display according to another exemplary embodiment of the inventive concept will be described in detail with reference to FIG. 7.

Figure 7:
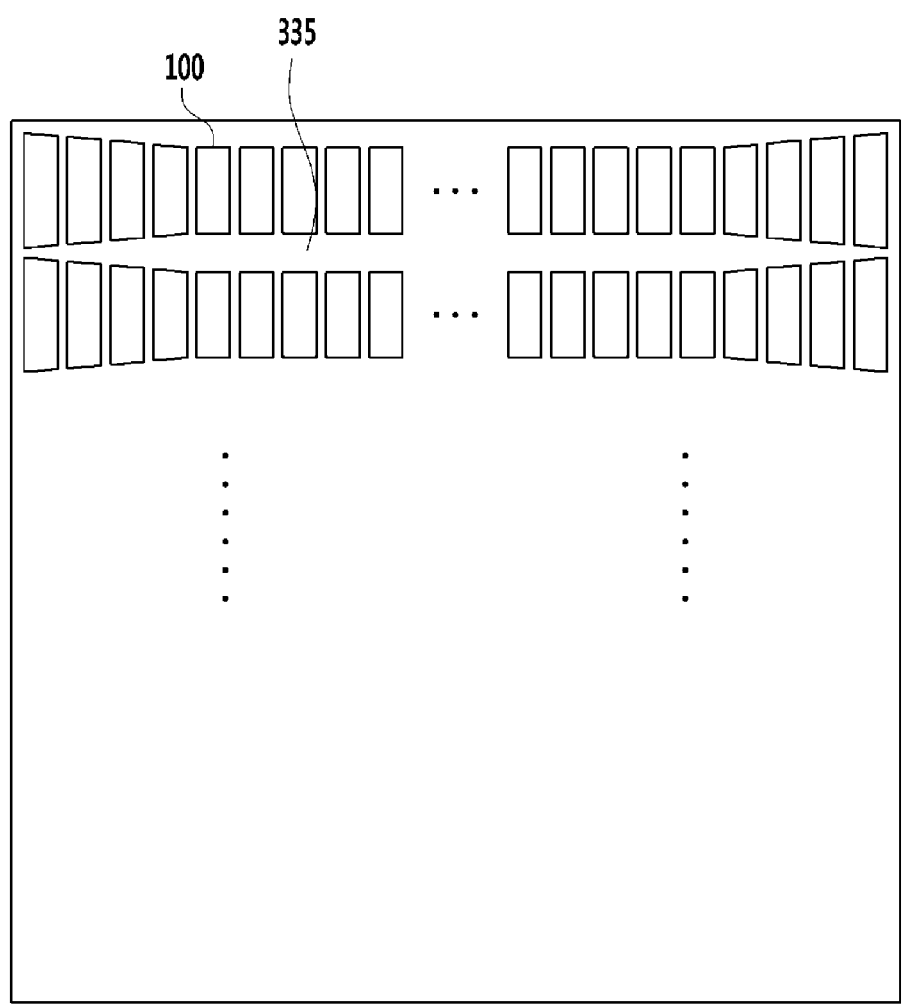
FIG. 7 is a pixel layout view of a liquid crystal display according to another exemplary embodiment of the present inventive concept.

FIG. 7 is a pixel layout view of a liquid crystal display according to another exemplary embodiment of the inventive concept.

In another exemplary embodiment of the inventive concept illustrated in FIG. 7, the liquid crystal display is substantially the same as that of the exemplary embodiment illustrated in FIG. 1, except for a shape of a pixel 100 and a size of an opening 335 formed at an edge region of a panel, so that a repeated description will be omitted.

As illustrated in FIG. 7, differently from the pixel 100 and the opening 335 of the liquid crystal display according to the exemplary embodiment illustrated in FIG. 1, in the pixel 100 formed at the edge region of the liquid crystal display according to another exemplary embodiment of the inventive concept, the opening 335 is gradually decreased as the opening becomes close to the edge region of the panel. Differently from the foregoing exemplary embodiments of the inventive concept, the openings 335 are continuously increased in size as a distance from the pixel 100 into which the liquid crystal is directly injected is increased. At least an outmost opening may be wider than an opening next to the outmost opening. At least five openings from an edge of the insulating substrate may be smaller than the opening in the center region.

A liquid crystal display according to another exemplary embodiment of the inventive concept will be described in detail with reference to FIG. 8.

Figure 8:
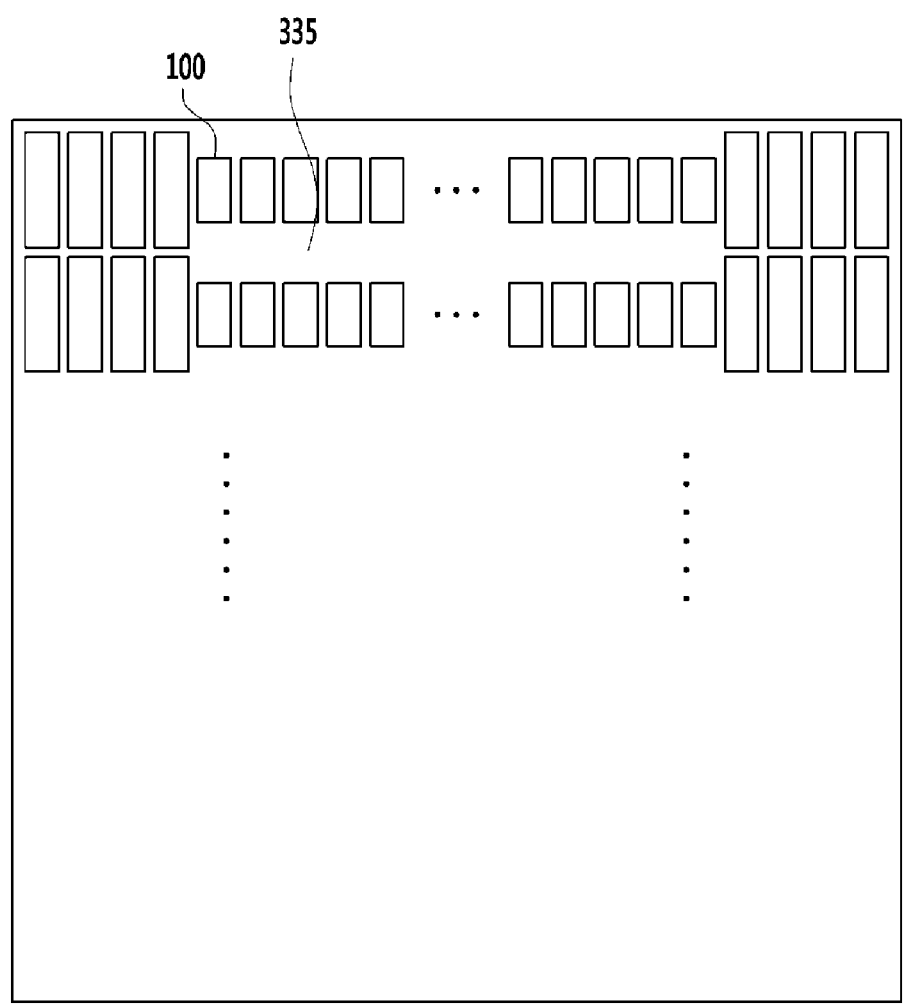
FIG. 8 is a pixel layout view of a liquid crystal display according to another exemplary embodiment of the present inventive concept.

FIG. 8 is a pixel layout view of a liquid crystal display according to another exemplary embodiment of the inventive concept.

In another exemplary embodiment of the inventive concept illustrated in FIG. 8, the liquid crystal display is substantially the same as that of the exemplary embodiment illustrated in FIG. 1, except for a shape of a pixel 100 and a size of an opening 335 formed at an edge region of a panel, so that a repeated description will be omitted.

As illustrated in FIG. 8, differently from the pixel 100 and the opening 335 of the liquid crystal display according to the exemplary embodiment illustrated in FIG. 1, in the pixel 100 formed at the edge region of the liquid crystal display according to another exemplary embodiment of the inventive concept, the opening 335 at the edge region of the panel is formed to be smaller with a predetemrined size than the opening 335 in the center region of the panel. At least an outmost opening may be wider than an opening next to the outmost opening. At least five openings from an edge of the insulating substrate may be smaller than the opening in the center region.

Hereinafter, a manufacturing method of a liquid crystal display according to an exemplary embodiment of the inventive concept will be described with reference to FIGS. 9 to 19.

FIGS. 9 to 19 are diagrams sequentially illustrating a manufacturing method of a liquid crystal display according to an exemplary embodiment of the inventive concept.

Figure 9:
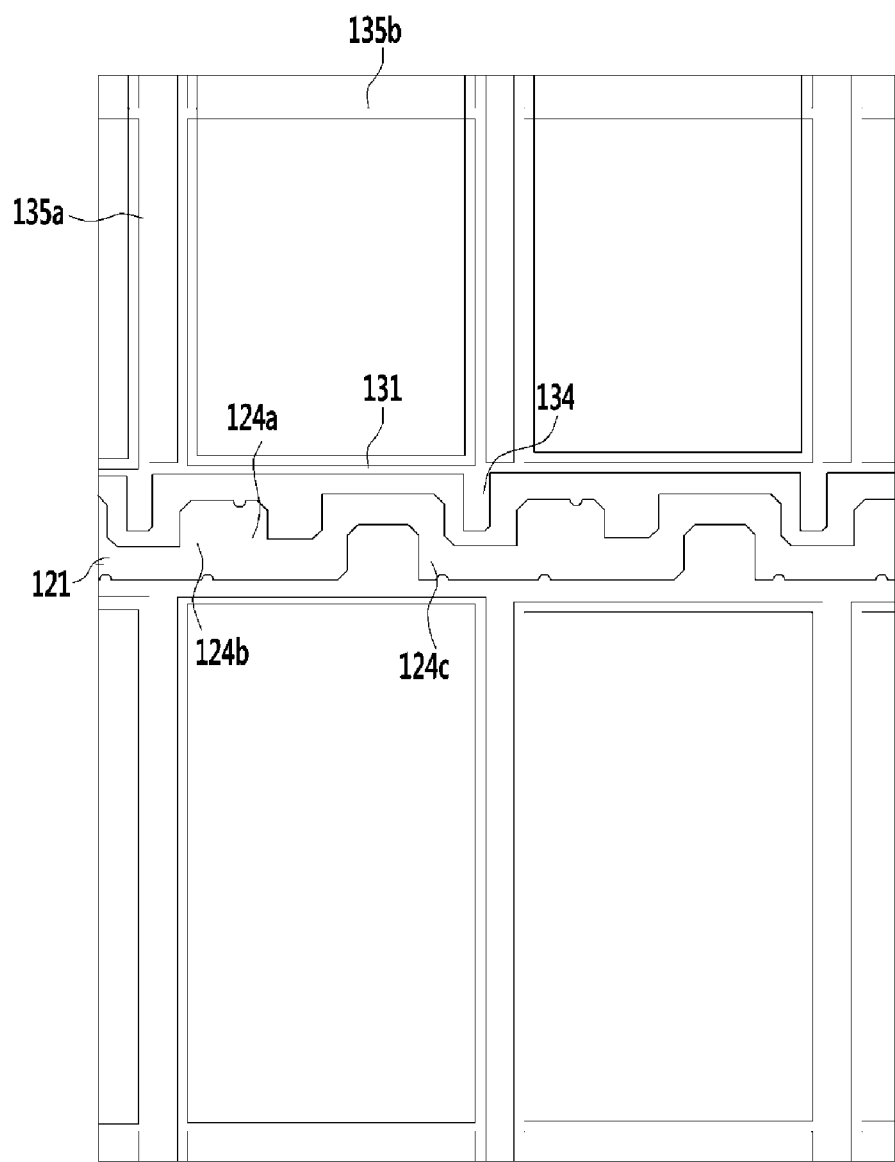
FIGS. 9, 10, 11, 12A, 12B, 13A, 13B, 14A, 14B, 14C, 15A, 15B, 15C, 16A, 16B, 16C, 17A, 17B, 17C, 18A, 18B, 18C and 18D are diagrams sequentially arranging a manufacturing method of the liquid crystal display according to an exemplary embodiment of the inventive concept.

First, FIG. 9 is a layout view in which a gate line 121 and a storage voltage line 131 are formed on the insulating substrate 110.

Referring to FIG. 9, the gate line 121 and the storage voltage line 131 are formed on the insulating substrate 110 formed of transparent glass or plastic. The gate line 121 and the storage voltage line 131 may be formed of the same material using the same mask. Further, the gate line 121 includes a first gate electrode 124a, a second gate electrode 124b, and a third gate electrode 124c, and the storage voltage line 131 includes a protrusion 134 protruding in a direction to the gate line 121, the storage electrodes 135a and the storage electrodes 135b. The storage electrodes 135a and 135b have a structure surrounding a first subpixel electrode 192h and a second subpixel electrode 192l of the front pixel. A gate voltage is applied to the gate line 121, and a storage voltage is applied to the storage voltage line 131, so that the gate line 121 and the storage voltage line 131 are separated from each other. The storage voltage may have a uniform voltage level or a swinging voltage level.

A gate insulating layer 140 covering the gate line 121 and the storage voltage line 131 is formed on the gate line 121 and the storage voltage line 131.

Figure 10:
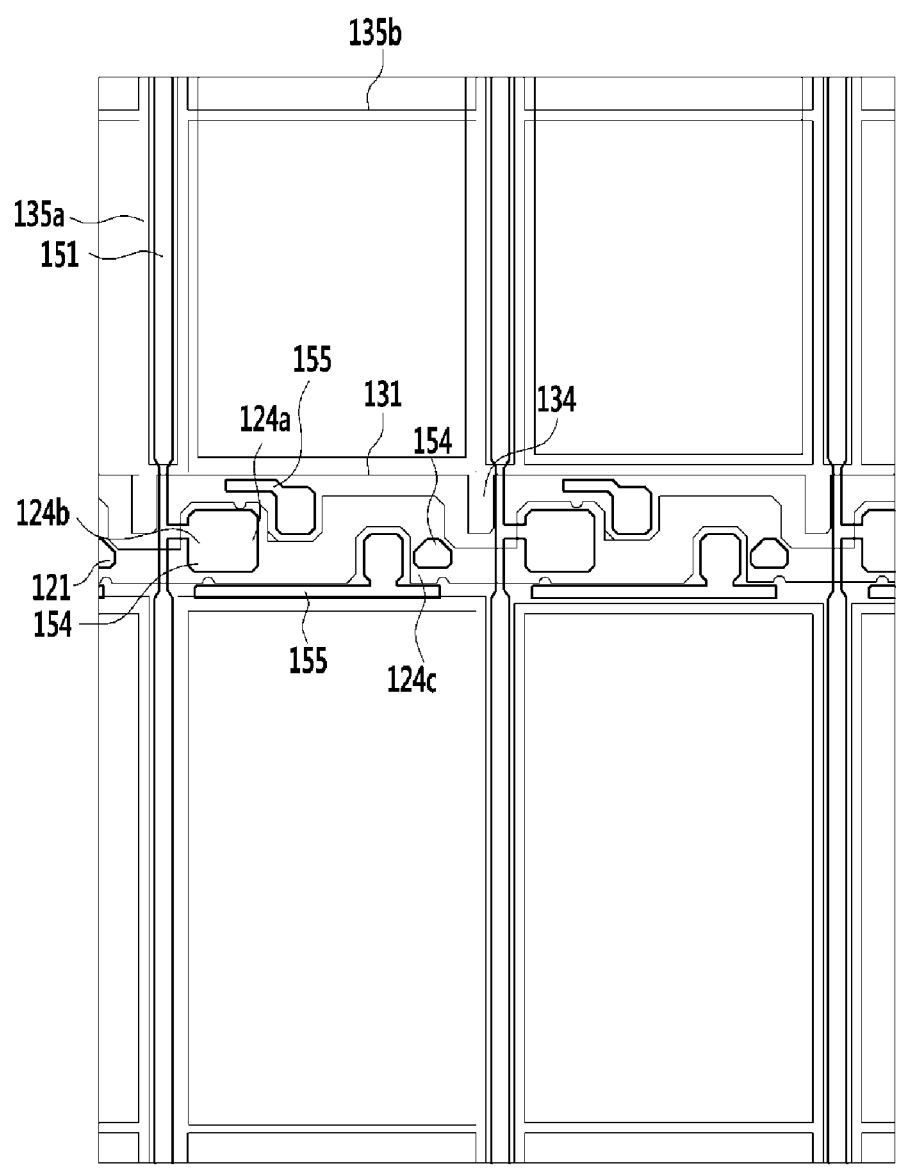
Figure 11:
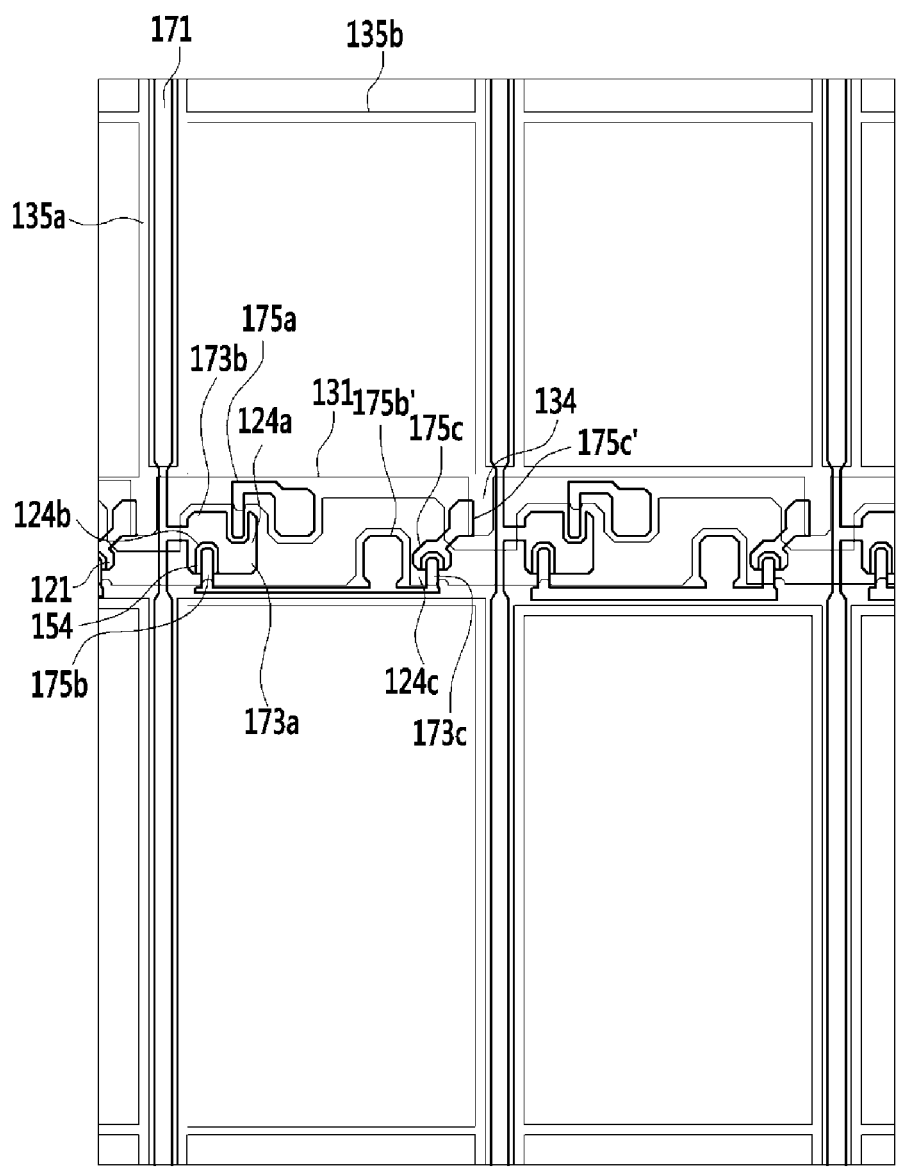

Then, as illustrated in FIGS. 10 and 11, semiconductors 151, 154, and 155, a data line 171, and source/drain electrodes 173a, 173b, 173c, 175a, 175b, and 175c are formed on the gate insulating layer 140.

FIG. 10 is a layout view in which the semiconductors 151, 154, and 155 are formed, and FIG. 11 is a layout view in which the data line 171 and the source/drain electrodes 173a, 173b, 173c, 175a, 175b, and 175c are formed, but actually, the semiconductors 151, 154, and 155, the data line 171, and the source/drain electrodes 173a, 173b, 173c, 175a, 175b, and 175c may be formed together by a process described below.

That is, a material forming the semiconductor and a material forming the data line and the source/drain electrodes are sequentially stacked. Then, two patterns are formed together using one mask (a slit mask or a transflective mask). In this case, in order to prevent the semiconductor 154 positioned at a channel portion of a thin film transistor from being etched when etching the data metal and the semiconductor, a photo resist on the channel portion is not fully exposed using a slit mask or a transflective mask. After etching the data metal and the semiconductor except the channel portion, the photo resist on the channel region is removed by ashing process. The data metal on the channel region is removed by etching process. The ohmic contacts may be removed when the data metal on the channel region is removed.

In this case, a plurality of ohmic contacts may be formed on each of the semiconductors, 151, 154, and 155, and between the data line 171 and the source/drain electrodes.

A first passivation layer 180 is formed on the entire region of the data conductors 171, 173c, 175a, 175b, and 175c and the exposed semiconductor portion 154. The first passivation layer 180 may include an inorganic insulation material, such as silicon nitride (SiNx) and silicon oxide (SiOx), an organic insulation material or a combination thereof.

Figure 12A:
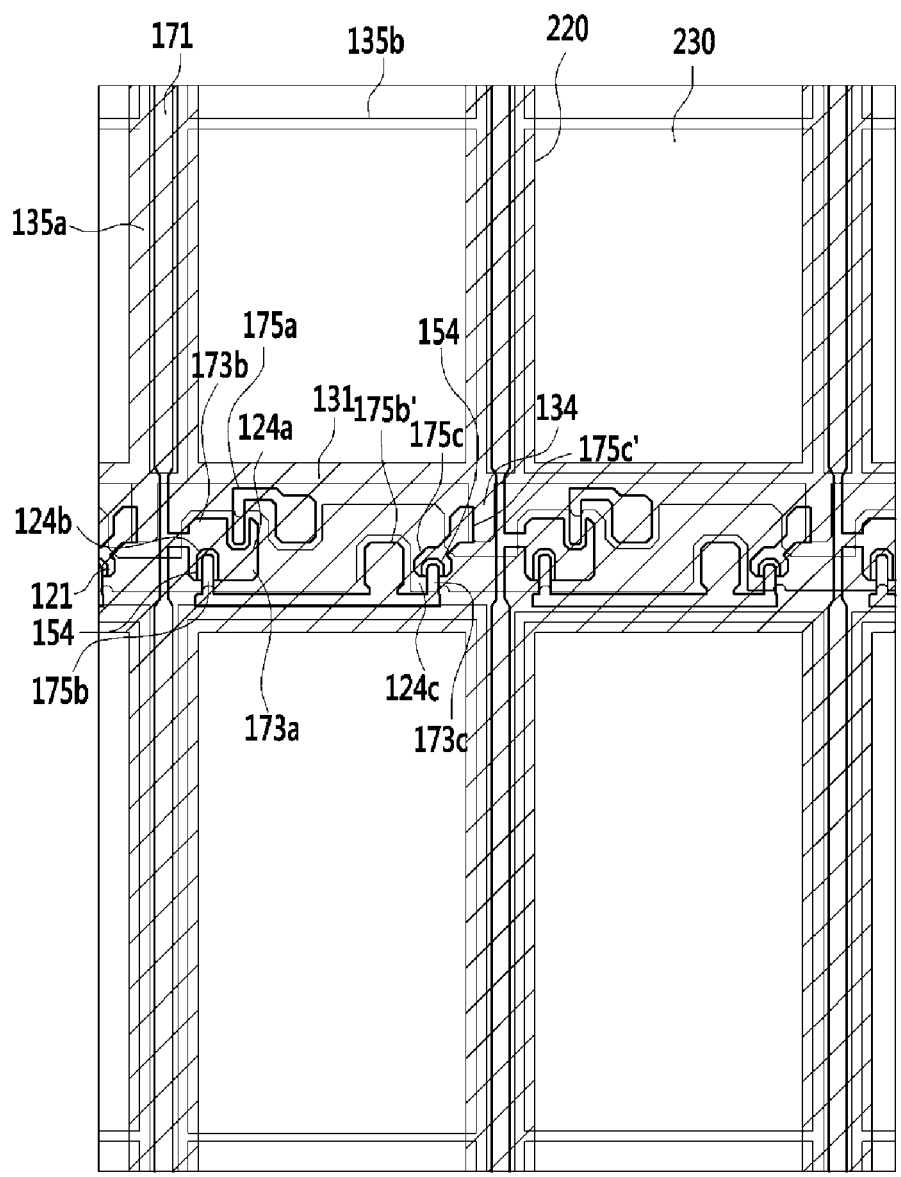
Figure 12B:
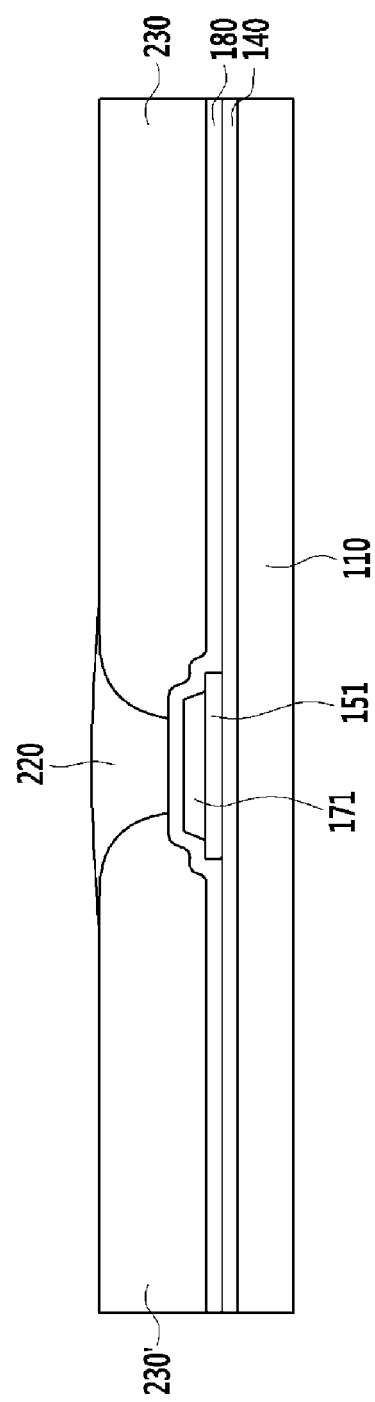

Then, as illustrated in FIGS. 12A and 12B, a color filter 230 and a light blocking member (black matrix) 220 are formed on the first passivation layer 180. Here, FIG. 12A is a layout view corresponding to FIG. 2, and FIG. 12B is a cross-sectional view corresponding to FIG. 3, and FIG. 12B illustrates the color filter 230 and the light blocking member 220 formed after exposing and etching.

When forming the color filter 230 and the light blocking member 220, the color filter 230 is first formed. The color filter 230 of one color elongates in a vertical direction (a direction of the data line), and the color filters 230 and 230' with different colors are formed in pixels adjacent in a horizontal direction (a direction of the gate line). As a result, exposing, developing, and etching processes need to be performed for each color filer 230 of each color. In the liquid crystal display including the three primary colors, the color filter 230 is formed by three times of each of the exposing, developing, and etching processes. In this case, the color filter 230' may overlap the color filter 230 while the first formed color filter 230' is formed in a lower portion, and the later formed color filter 230 is formed in an upper portion on the data line 171.

The color filter 230 may be removed in advance at positions at which contact holes 186a, 186b, and 186c are formed when etching the color filter 230.

The color filter 203 may be formed using a printing method such as ink jet printing or off-set printing.

The light blocking member 200 is formed of a material preventing light from passing through on the color filter 230. Referring to a portion with hatched lines (indicating the light blocking member 220) of FIG. 12A, the light blocking member 220 is formed in a lattice structure having an opening corresponding to a region displaying an image. The color filter 230 is formed in the opening.

As illustrated in FIG. 12A, the light blocking member 220 has a portion formed in a horizontal direction and a portion formed in vertical direction based on the region in which the data line 171 is formed along a transistor formed region in which the gate line 121, the storage voltage line 131, and the thin film transistor are formed.

Figure 13A:
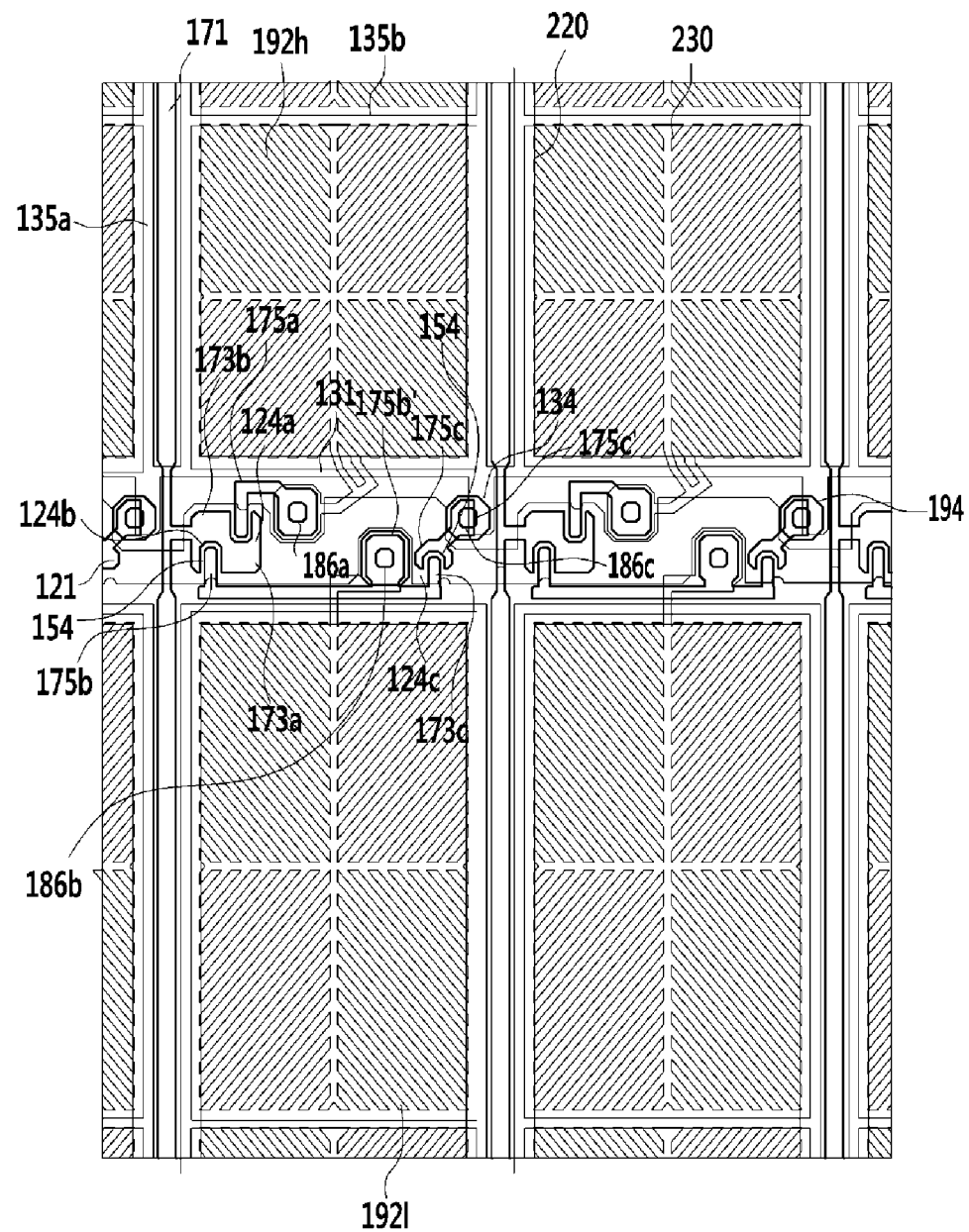
Figure 13B:
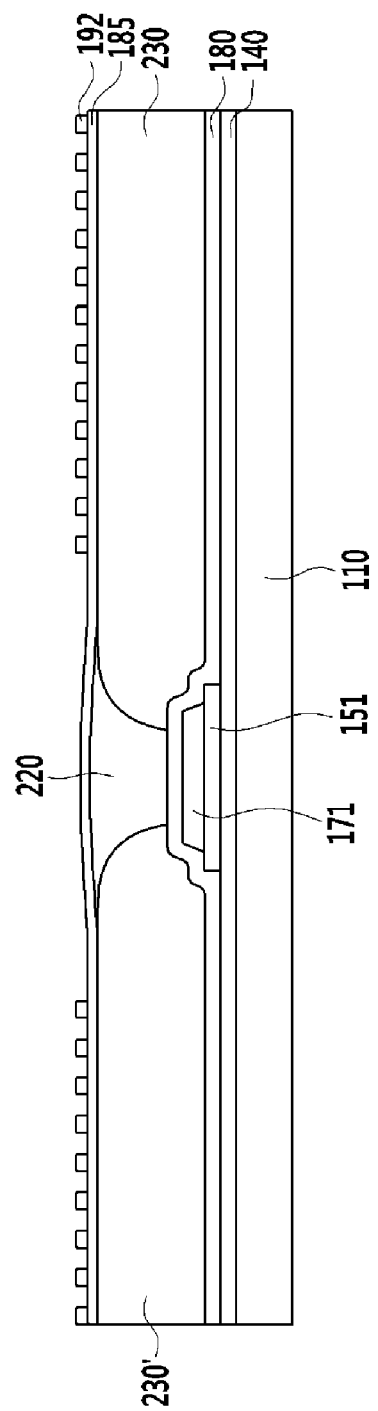

Referring to FIGS. 13A and 13B, a second passivation layer 185 is formed throughout an entire region on the color filer 230 and the light blocking member 220. The second passivation layer 185 may include an inorganic insulating material, such as silicon nitride (SiNx) and silicon oxide (SiOx), an organic insulating material or a combination thereof.

Then, a first contact hole 186a and a second contact hole 186b, through which the first drain electrode 175a and an expanded portion 175b' of the second drain electrode 175b are exposed, respectively, are formed in the color filter 230, the light blocking member 220, and the passivation layers 180 and 185. Further, a third contact hole 186c, through which the protrusion 134 of the storage voltage line 131 and an expanded portion 175c' of the third drain electrode 175c are exposed, is formed in the color filter 230, the light blocking member 220, and the passivation layers 180 and 185.

Then, a pixel electrode 192 including the first subpixel electrode 192h and the second subpixel electrode 192l is formed on the second passivation layer 185. In this case, the pixel electrode 192 may be made of a transparent conductive material, such as ITO or IZO. Further, the first sub pixel electrode 192h and the second sub pixel electrode 192l are physically and electrically connected with the first drain electrode 175a and the second drain electrode 175b through the contact holes 186a and 186b, respectively. Further, a connection member 194 electrically connecting the expanded portion 175c' of the third drain electrode 175c and the protrusion 134 of the storage voltage line 131 through the third contact hole 186c is formed. As a result, a part of the data voltage applied to the second drain electrode 175b is divided through the third source electrode 173c, so that a voltage applied to the second subpixel electrode 192l may be smaller than the voltage applied to the first subpixel electrode 192h.

Here, FIG. 13B is a view corresponding to FIG. 3, and is a cross-sectional view of the liquid crystal display formed up to the process of FIG. 13A.

Figure 14A:
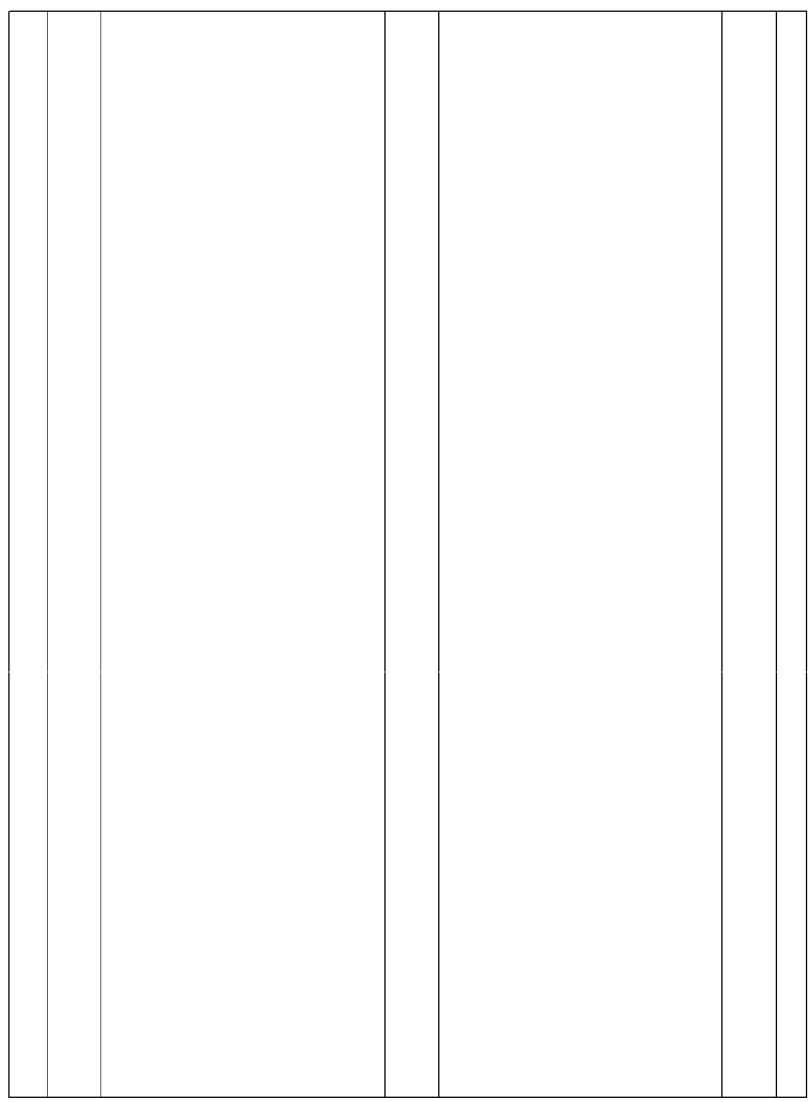
Figure 14B:
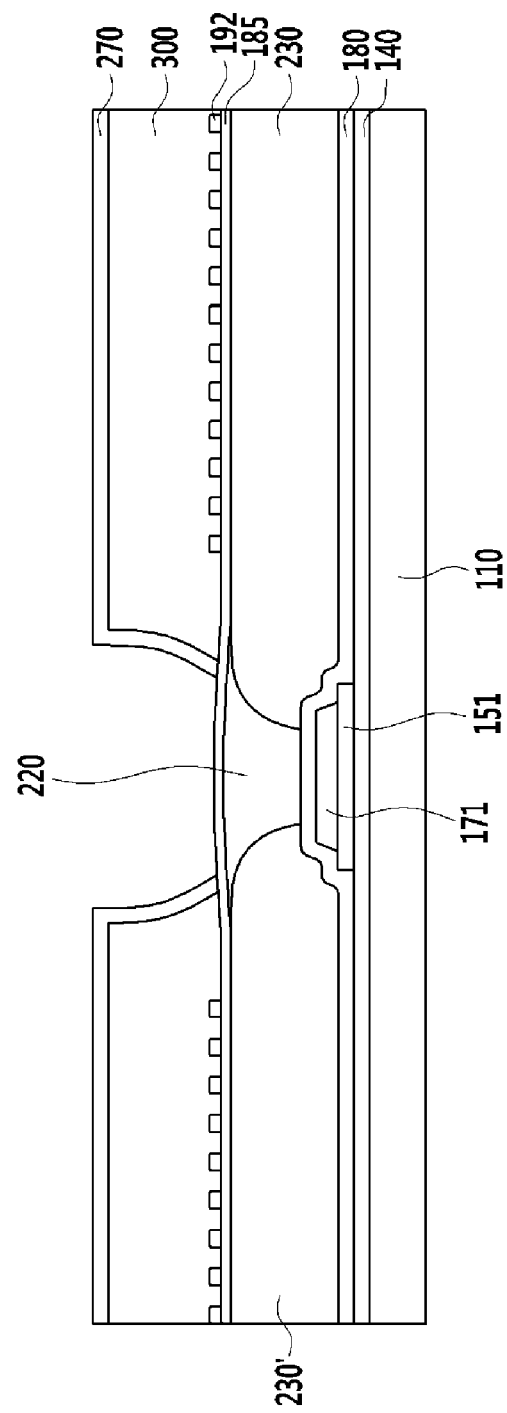
Figure 14C:
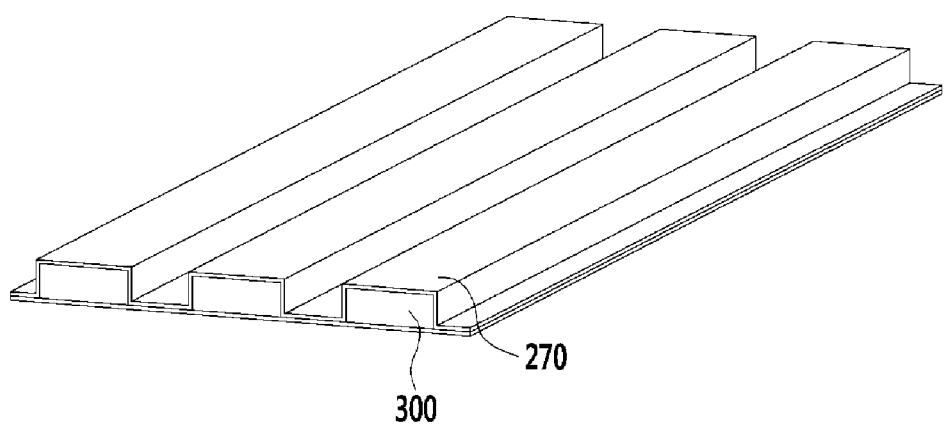

Then, as illustrated in FIG. 14C, a sacrificial layer 300 and a common electrode 270 are formed. The sacrificial layer 300 and the common electrode 270 illustrated in FIG. 14C are manufactured by a method described below.

As illustrated in FIGS. 14A to 14C, the sacrificial layer 300 is formed by stacking a photoresist (PR) on the entire surface of the liquid crystal display panel on which the second passivation layer 185, the pixel electrode 192, and the like are formed, and the sacrificial layer 300 separated for each pixel 100 is formed through the exposure and development processes.

The sacrificial layer 300 is not formed at a region corresponding to the second passivation layer 185 at which the light blocking member 220 is formed on the data line.

Then, the common electrode 270 is formed by laminating a transparent conductive material, such as ITO or IZO, on the entire surface of the insulating substrate 110, as a portion corresponding to the position on the sacrificial layer 300 and the second passivation layer 185 at which the light blocking member 220 is formed on.

As a result, a linear pattern of the sacrificial layer 300 and the common electrode 270 is completed as illustrated in FIG. 14C.

Figure 15A:
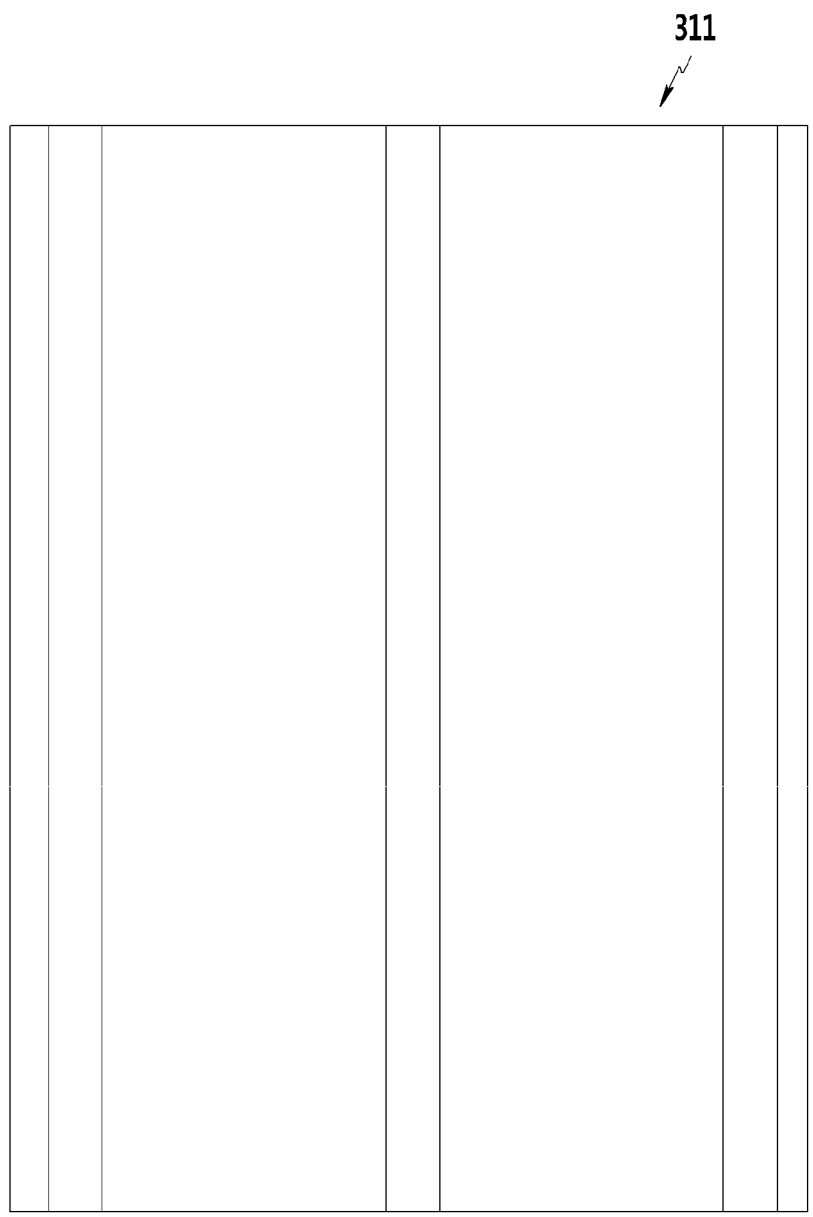
Figure 15B:
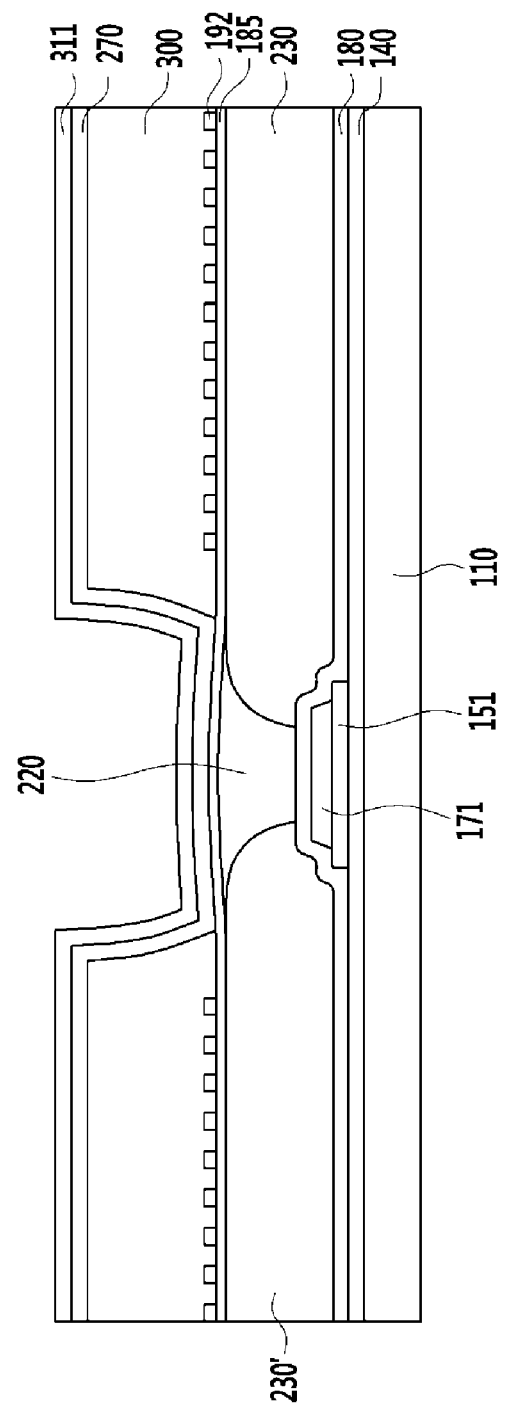
Figure 15C:
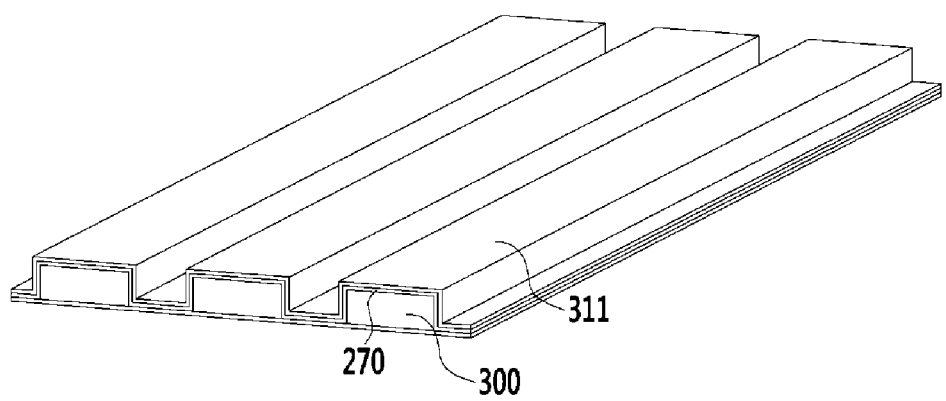

Then, as illustrated in FIGS. 15A to 15C, a lower insulating layer 311 including an inorganic insulating material, such as silicon nitride (SiNx), is formed on the entire surface of the liquid crystal display panel on which the linear pattern of the sacrificial layer 300 and the common electrode 270 is formed. The lower insulating layer 311 covers the linear pattern of the sacrificial layer 300 and the common electrode 270.

Figure 16A:
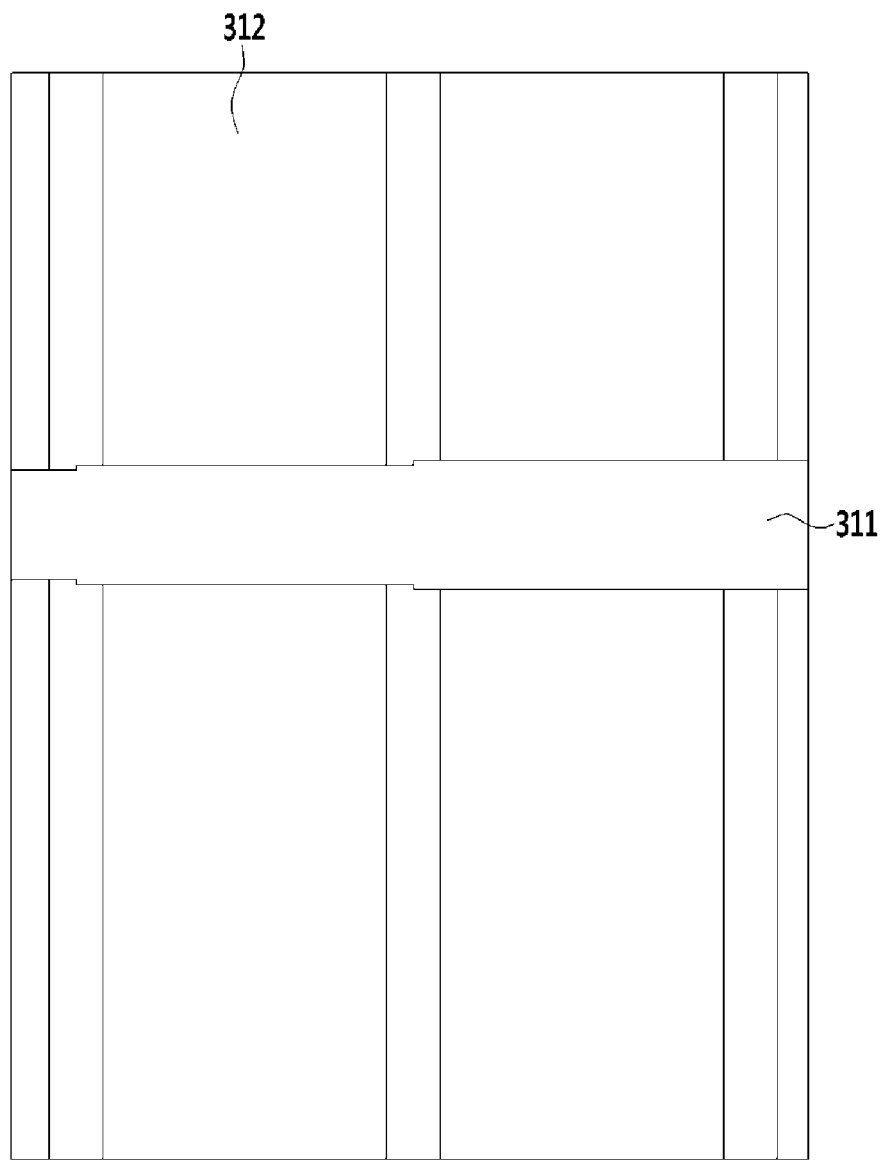
Figure 16B:
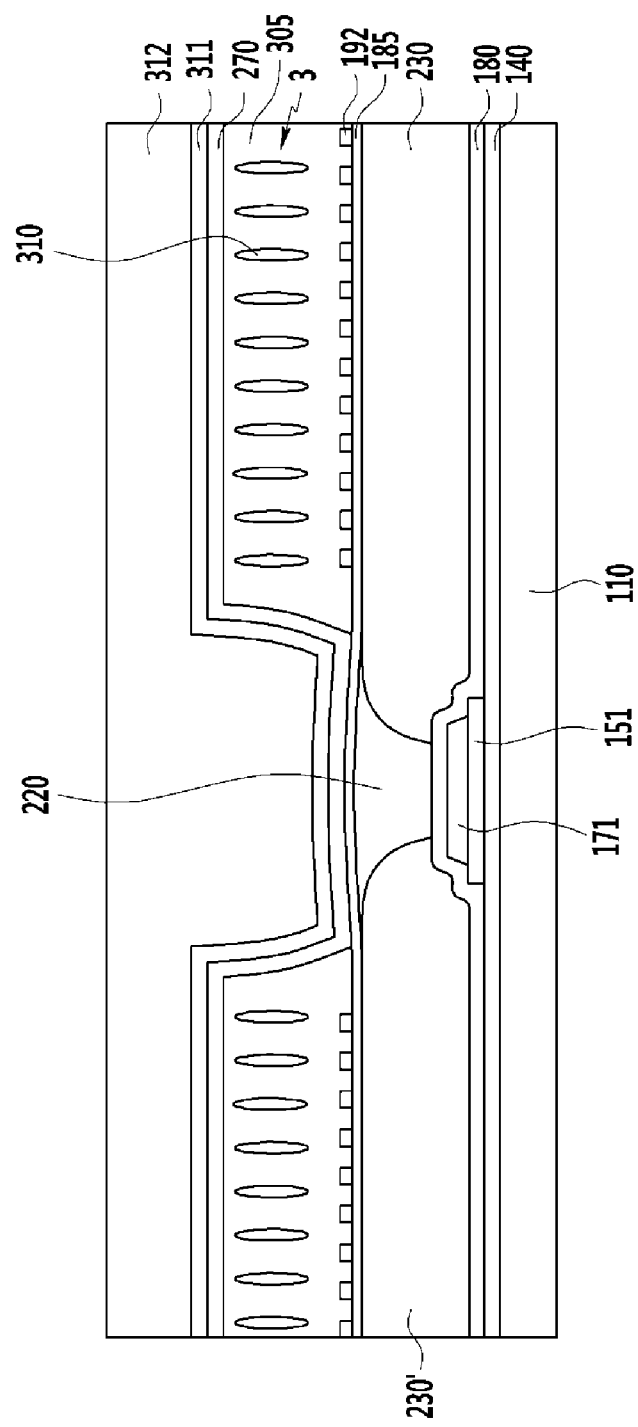
Figure 16C:
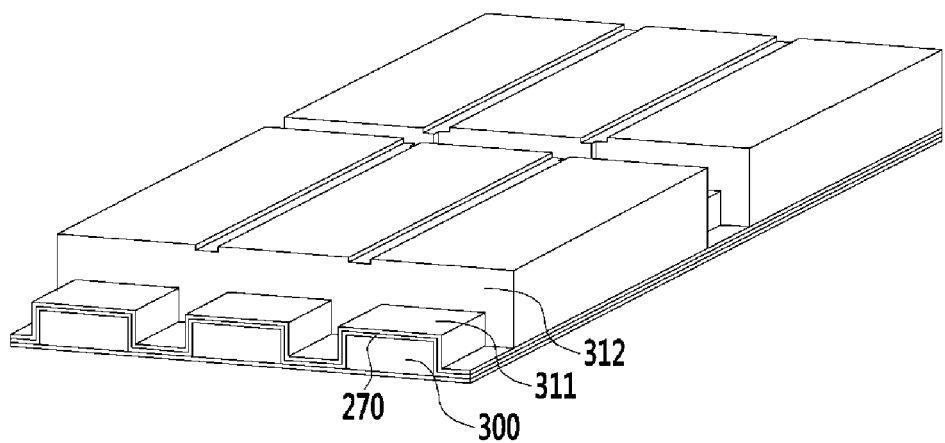

Then, a roof layer 312 is formed as illustrated in FIGS. 16A to 16C. The roof layer 312 may be formed to include an organic material, and the roof layer 312 is removed in a region corresponding to the opening 335 (hereinafter, referred to as a "liquid crystal injection hole open region"). FIG. 16A illustrates that the liquid crystal injection hole open region is formed in accordance with the thin film transistor formed region, and the liquid crystal injection hole open region has a structure elongating in a direction in which the gate line is formed. Thus, the lower insulating layer 311 is exposed as disclosed in FIGS. 16A to 16C.

In order to form the microcavity 305 to have a vertical length elongating as being close to the edge region of the panel, the roof layer 312 is etched so that an open region of the opening 335 becomes narrow.

The roof layer 312 is formed by laminating a material for the roof layer including an organic material on an entire region of the panel, exposing and developing the material by using a mask, and then removing the material for the roof layer in a region corresponding to the liquid crystal injection hole open region. In this case, the lower insulating layer 311 formed in a lower portion of the roof layer 312 is not etched, thereby being exposed after developing. Only the sacrificial layer 300, the common electrode 270, and the lower insulating layer 311 are formed in the liquid crystal injection hole open region, and the sacrificial layer 300, the common electrode 270, the lower insulating layer 311, and the roof layer 312 are stacked in the other regions.

Figure 17A:
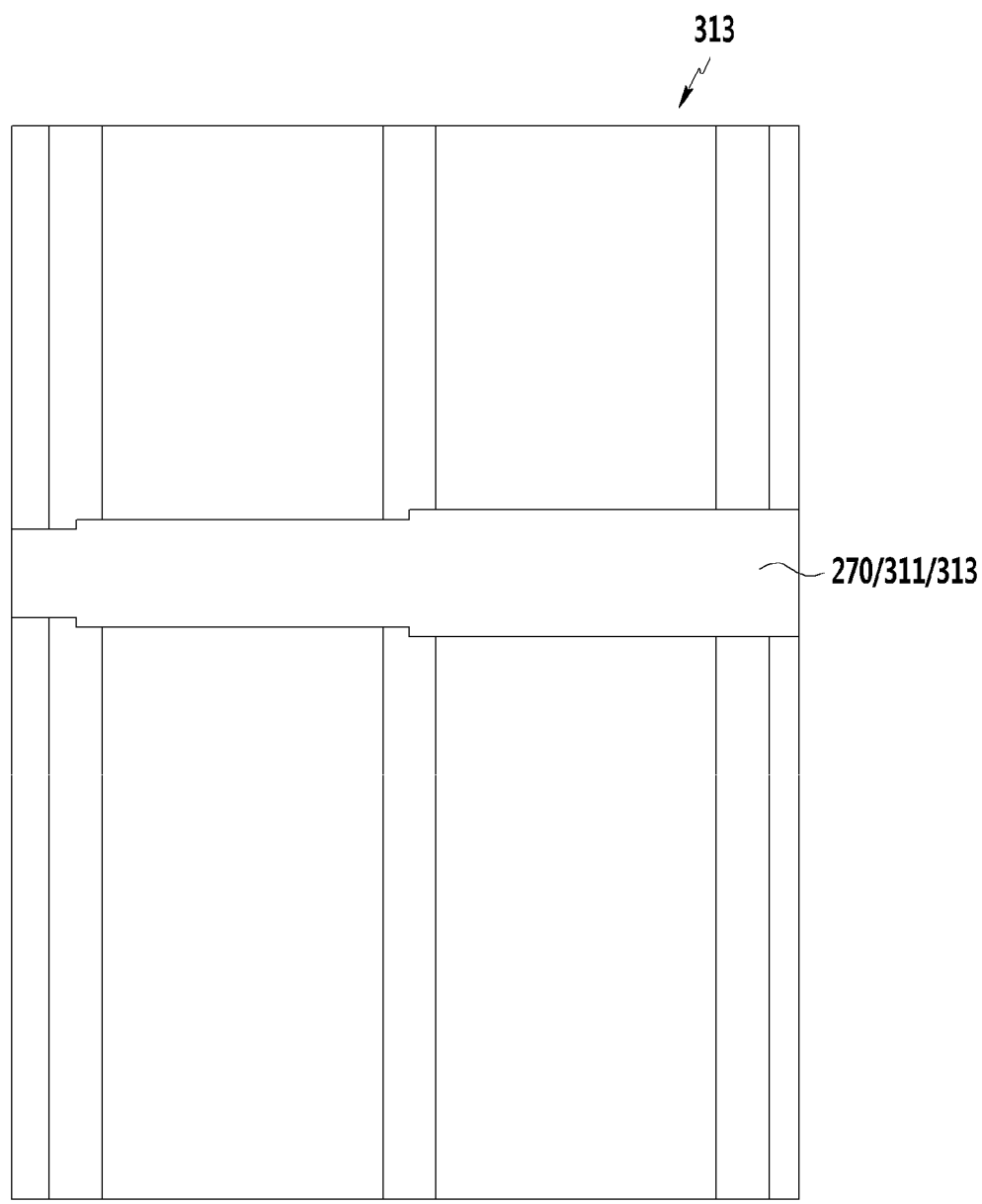
Figure 17B:
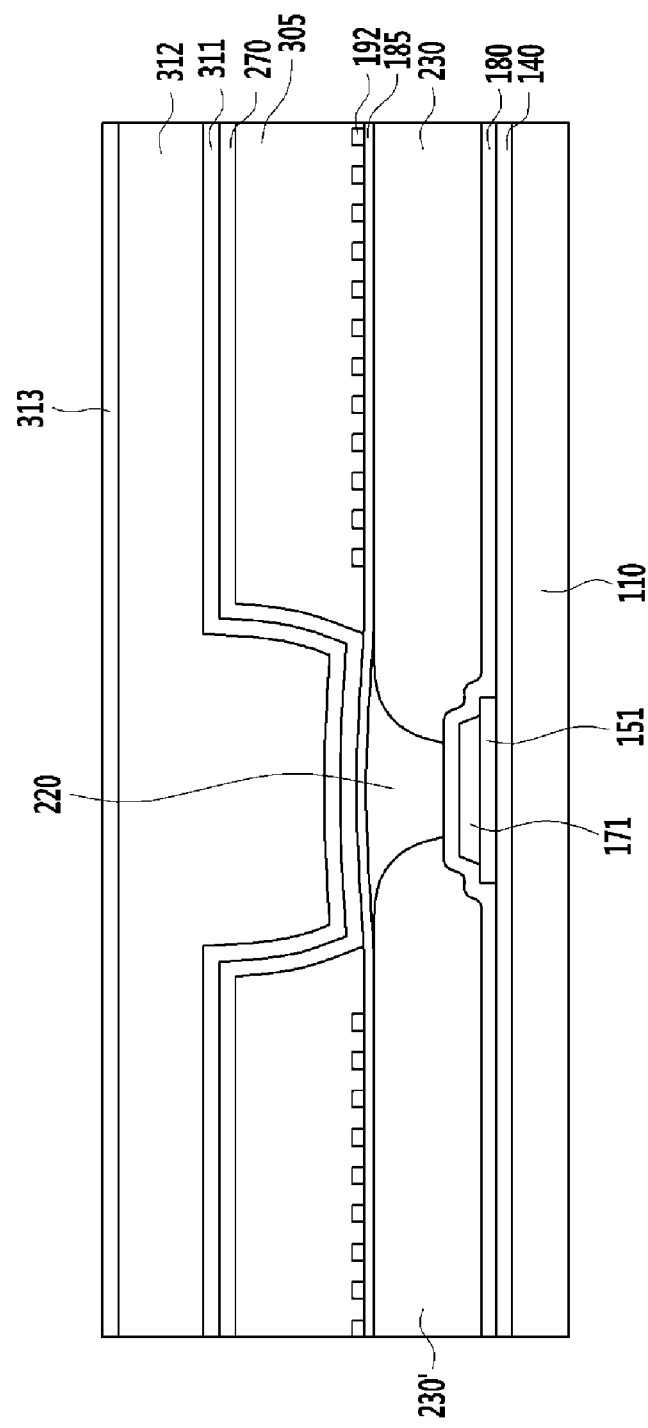
Figure 17C:
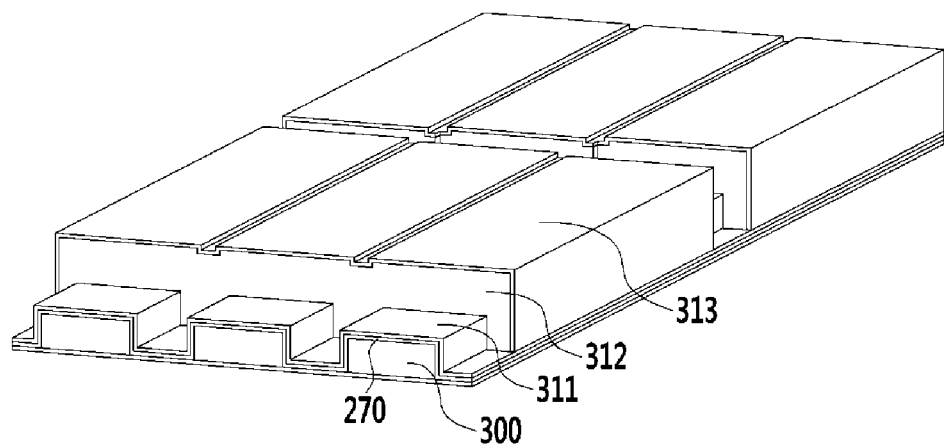

Then, as illustrated in FIGS. 17A to 17C, an upper insulating layer 313 is formed on the entire surface of the liquid crystal display panel by laminating a material for the upper insulating layer including an inorganic insulating material, such as silicon nitride (SiNx).

Figure 18A:
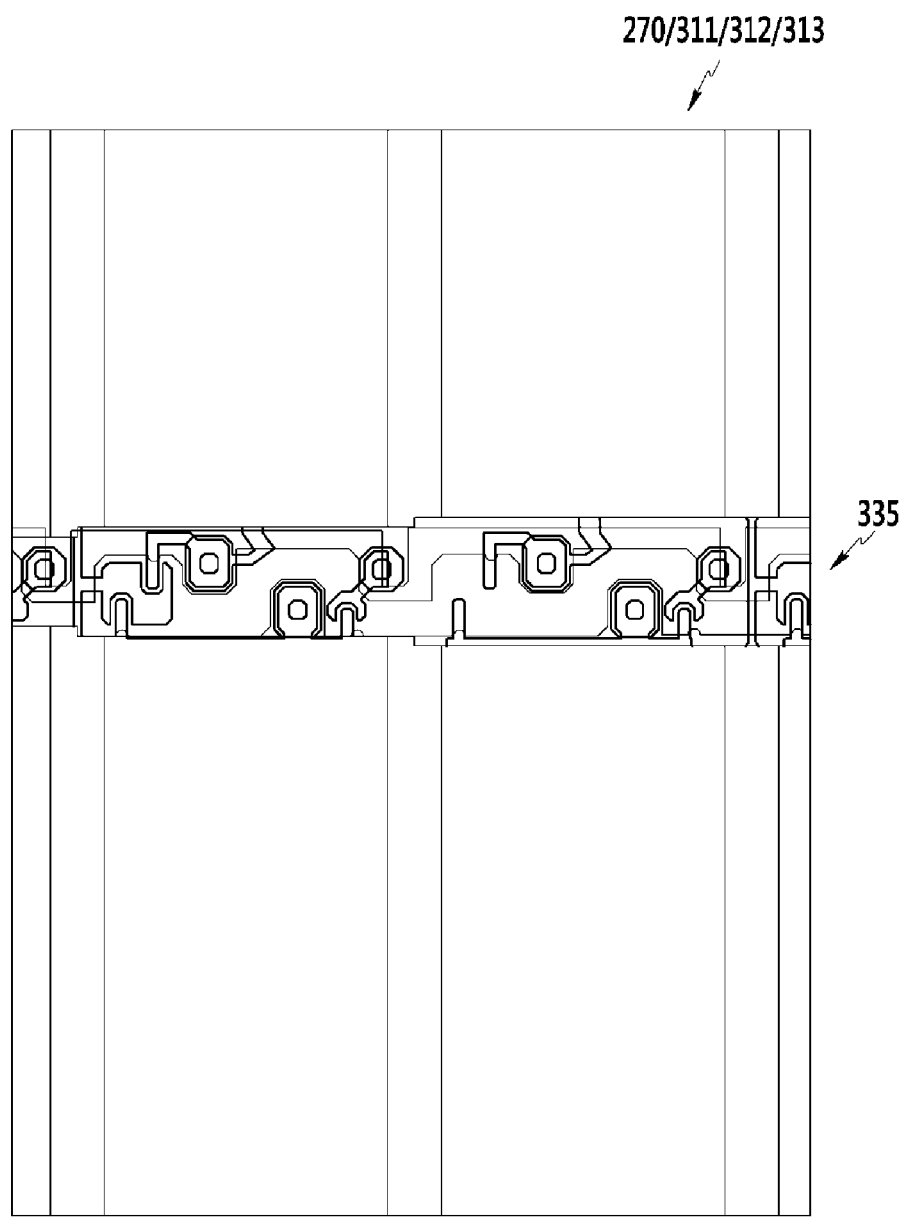
Figure 18B:
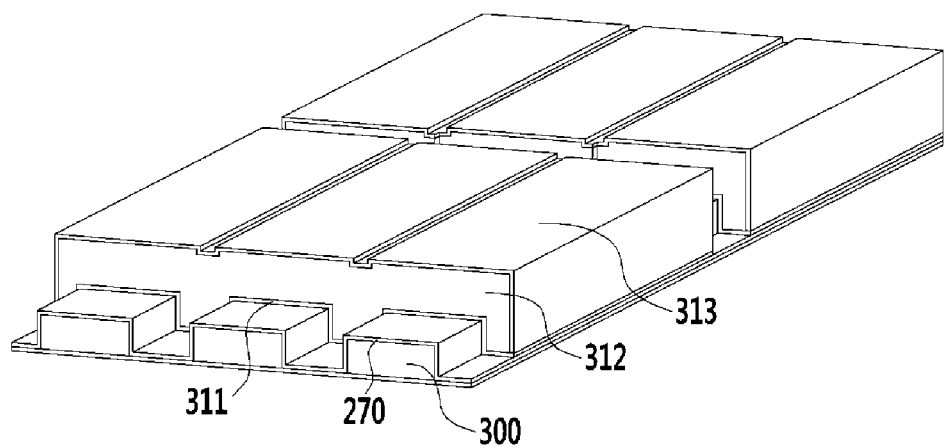
Figure 18C:
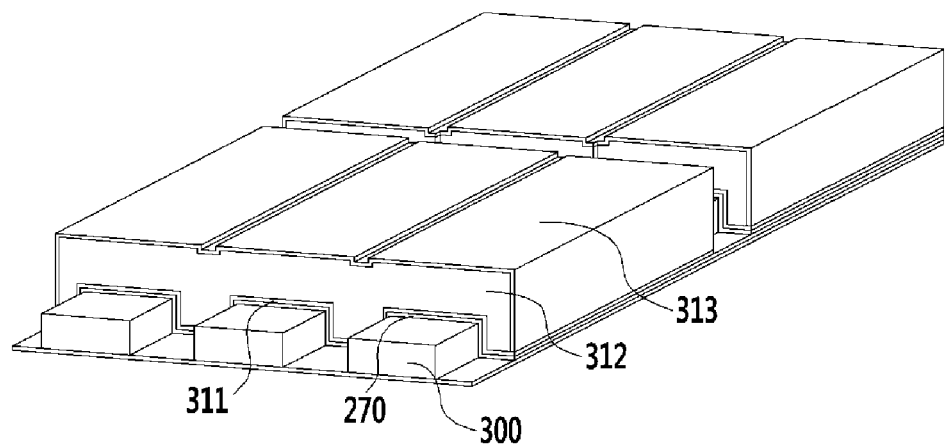
Figure 18D:
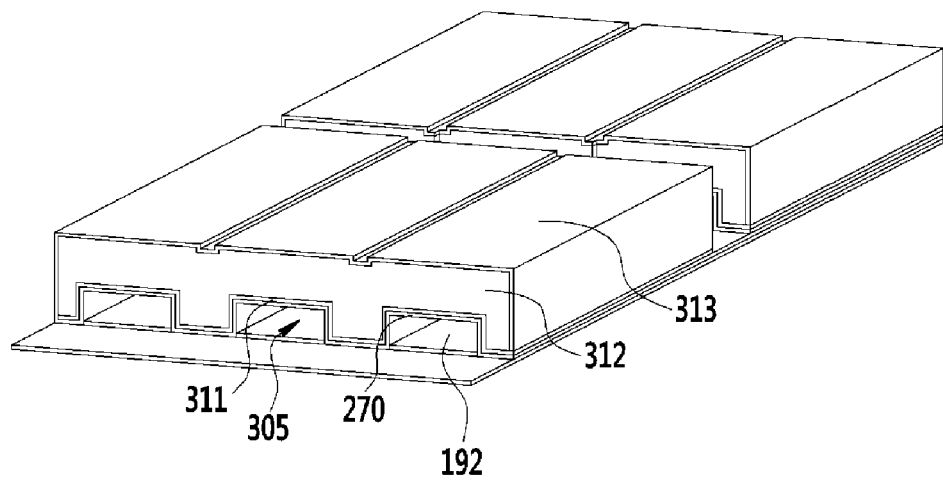

Then, as illustrated in FIGS. 18A and 18D, the opening 335 is formed by etching the liquid crystal injection hole open region.

In order to form the microcavity 305 to have the vertical length elongating as being close to the edge region of the panel, the opening 335 is formed by etching the liquid crystal injection hole open region in a form in which the liquid crystal injection hole open region becomes narrow.

Particularly, as illustrated in FIG. 18B, the common electrode 270 is left by etching the lower insulating layer 311 and the upper insulating layer 313 formed in the liquid crystal injection hole open region between the upper insulating layer 313 and the lower insulating layer 311 formed of an inorganic insulating material, such as silicon nitride (SiNx) and stacked on the entire region of the display panel.

Then, as illustrated in FIG. 18C, the sacrificial layer 300 is exposed by etching even the common electrode 270 formed in the liquid crystal injection hole open region. In this case, depending on the exemplary embodiment, a part of the common electrode 270 may be left so that the adjacent common electrodes 270 are electrically connected with each other.

That is, in order to etch the open region of the opening 335, a photoresist (PR) is formed on the entire region, a photoresist pattern is formed by removing the photoresist (PR) corresponding to the liquid crystal injection hole open region, and then the open region of the opening 335 is etched according to the photoresist pattern, so that the liquid crystal injection hole open region is etched. In this case, the etched layers in the liquid crystal injection hole open region include the material 313 for the upper insulating layer, the lower insulating layer 311, the common electrode 270, and the sacrificial layer 300, and the layers thereunder are not etched. Depending on the exemplary embodiment, the sacrificial layer 300 may be partially etched or may not be etched at all. Here, the process of etching the liquid crystal injection hole open region may be performed by dry etching, and in a case where an etchant capable of etching a layer to be etched together is present, the liquid crystal injection hole open region may be etched by wet etch.

Then, the exposed sacrificial layer 300 is removed as illustrated in FIG. 18D.

Then, as illustrated in FIGS. 3 and 4, an alignment layer (not illustrated) or the liquid crystal layer 3 is injected into the microcavity 305 by using capillary force.

As described above, the opening 335 is formed to have a smaller size as being close to an edge of the panel. Thus, stronger capillary force is formed as a distance becomes far from the pixel 100 formed in the center region of the panel into which the liquid crystal is directly injected. Accordingly, it is possible to easily inject the liquid crystal and achieve excellent liquid crystal alignment.

Then, although not illustrated, in order to prevent the liquid crystal layer 3 injected into the microcavity 305 from leaking to the outside, a process of sealing the microcavity 305 by forming a capping layer (not illustrated) may be processed.

Further, a process of attaching a polarizer (not illustrated) onto a lower portion of the insulating substrate 110 and an upper portion of the upper insulating layer 313 may be added. The polarizer may include a polarization element generating polarization and a TAC (tri-acetyl-cellulose) layer for ensuring durability, and directions of transmissive axes of an upper polarizer and a lower polarizer may be vertical or parallel according to the exemplary embodiment.

Depending on the exemplary embodiment, the lower insulating layer 311 and the upper insulating layer 313 may be omitted.

Hereinafter, another exemplary embodiment of the inventive concept will be described with reference to FIG. 19.

Figure 19:
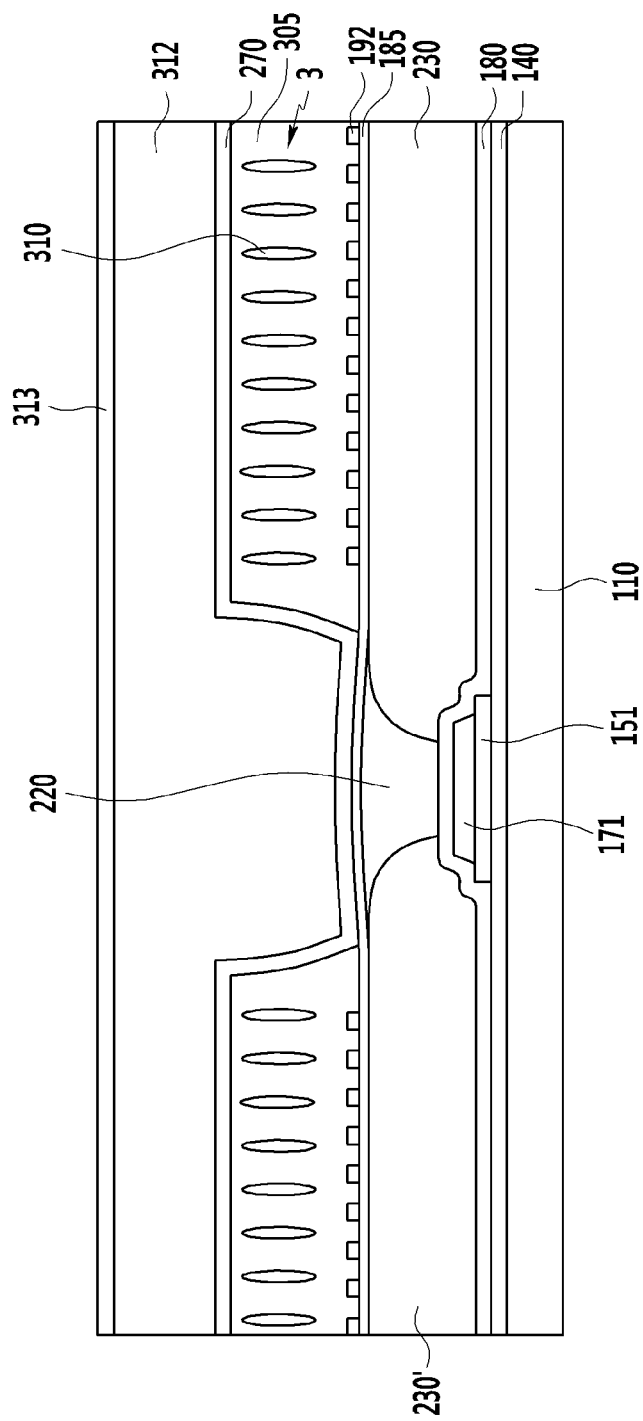
FIG. 19 is a diagram illustrating a liquid crystal display according to another exemplary embodiment of the inventive concept.

FIG. 19 is a diagram illustrating a liquid crystal display according to another exemplary embodiment of the inventive concept.

FIG. 19 is a diagram corresponding to FIG. 3, and the exemplary embodiment of the inventive concept of FIG. 19 is substantially the same as the exemplary embodiment of the inventive concept described with reference to FIG. 3, except for a lower insulating layer 311 only, so that a repeated description will be omitted.

In the exemplary embodiment of FIG. 19, differently from the exemplary embodiment of FIG. 3, the lower insulating layer 311 is omitted.

According to the exemplary embodiment of the inventive concept, it is advantageously possible to prevent a display defect generable due to the the liquid crystal at the outside of the microcavity at the edge of the panel, prevent a liquid crystal alignment defect inside the microcavity formed at the edge region of the panel, and display an image up to the edge of the panel through the excellent liquid crystal alignment inside the microcavity formed at the edge region of the panel, thereby further decreasing a bezel area of the display device.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display, comprising:
    an insulating substrate including a center region and an edge region surrounding the center region;
    a plurality of pixel electrodes disposed on the insulating substrate;
    a roof layer overlapping the plurality of pixel electrodes; and
    a liquid crystal layer disposed in a plurality of separated microcavities including liquid crystal molecules between the plurality of pixel electrodes and the roof layer,
    wherein the plurality of microcavities include a first row of microcavities and a second row of microcavities,
    wherein the roof layer includes openings for injecting the liquid crystal molecules into the plurality of microcavities,
    wherein an opening of the openings is disposed between the first row of microcavities and the second row of microcavities, and
    wherein the opening in the center region has a substantially uniform size, and the opening in the edge region is smaller than the opening in the center region.

2. The liquid crystal display of claim 1, wherein:
    at least one column of the openings formed at the edge region of the insulating substrate is formed to be smaller than the openings formed in the center regions of the insulating substrate.

3. The liquid crystal display of claim 2, wherein:
    a size of the opening formed at the edge region of the insulating substrate is about 3 μm to less than 55 μm.

4. The liquid crystal display of claim 2, wherein:
    the opening is gradually narrow in a step shape from the center regions of the insulating substrate to the edge region of the insulating substrate.

5. The liquid crystal display of claim 4, wherein:
    the size of the opening is formed to be decreased from a position, at which the microcavity positioned 3 to 8 columns inside based on the plurality of separated microcavities in a direction of the center regions of the insulating substrate is formed, to the edge region of the insulating substrate.

6. The liquid crystal display of claim 1, wherein:
    the opening is gradually decreased in a step shape from the center regions of the insulating substrate to the edge region of the insulating substrate.

7. The liquid crystal display of claim 6, wherein:
    at least an outmost opening is wider than a portion of the opening next to the outmost opening.

8. The liquid crystal display of claim 1, wherein:
    the opening is continuously decreased in size from the center regions of the insulating substrate to the edge region of the insulating substrate.

9. The liquid crystal display of claim 8, wherein:
    at least an outmost opening is wider than a portion of the opening next to the outmost opening.

* * * * *